July 25, 1961 L. H. THOMAS ET AL 2,994,065

SELF-SORTING STORAGE DEVICES

Filed March 14, 1956 23 Sheets-Sheet 1

INVENTORS
LLEWELYN H. THOMAS
JAMES W. TONER
BY [signature]
ATTORNEY

SELF-SORTING STORAGE DEVICES

Filed March 14, 1956 23 Sheets-Sheet 2

INVENTORS
LLEWELYN H. THOMAS
JAMES W. TONER
BY [signature]
ATTORNEY

TRANSFER SELECTION MATRIX

INVENTORS
LLEWELYN H. THOMAS
JAMES W. TONER
BY [signature]
ATTORNEY

SELF-SORTING STORAGE DEVICES

Filed March 14, 1956

INVENTORS
LLEWELYN H. THOMAS
JAMES W. TONER
BY John A. Hall
ATTORNEY

INVENTORS
LLEWELYN H. THOMAS
JAMES W. TONER
BY [signature]
ATTORNEY

SELF-SORTING STORAGE DEVICES

Filed March 14, 1956 23 Sheets-Sheet 6

INVENTORS
LLEWELYN H. THOMAS
JAMES W. TONER
BY [signature]
ATTORNEY

SELF-SORTING STORAGE DEVICES

Filed March 14, 1956 23 Sheets-Sheet 7

INVENTORS
LLEWELYN H. THOMAS
JAMES W. TONER
BY John A. Hall
ATTORNEY

July 25, 1961 L. H. THOMAS ET AL 2,994,065

SELF-SORTING STORAGE DEVICES

Filed March 14, 1956 23 Sheets-Sheet 8

INVENTORS
LLEWELYN H. THOMAS
JAMES W. TONER
BY [signature]
ATTORNEY

July 25, 1961 L. H. THOMAS ET AL 2,994,065

SELF-SORTING STORAGE DEVICES

Filed March 14, 1956 23 Sheets-Sheet 9

INVENTORS
LLEWELYN H. THOMAS
JAMES W. TONER
BY [signature]
ATTORNEY

SELF-SORTING STORAGE DEVICES

Filed March 14, 1956 23 Sheets-Sheet 10

SORTING PATTERN

| | | | | | | | | | | | | | | | | |
|---|---|---|---|---|---|---|---|---|---|---|---|---|---|---|---|---|
| SORTING CYCLE | 1 | 2 | 3 | 4 | 5 | 6 | 7 | 8 | 9 | 10 | 11 | 12 | 13 | 14 | 15 | 16 |
| USAGE NUMBERS C | 94 | 68 | 67 | 23 | 94 | 00 | 61 | 68 | 94 | 13 | 61 | 93 | 94 | 75 | 68 | 93 |
| B | 40 | 12 | 00 | 41 | 93 | 67 | 41 | 93 | 67 | 41 | 68 | 67 | 41 | 61 | 67 | 41 |
| A | 41 | 93 | 40 | 68 | 40 | 23 | 40 | 23 | 40 | 23 | 40 | 23 | 40 | 23 | 40 | 23 |
| APPARENT MAGNITUDES B > C | | | | 1 | | 1 | | 1 | | 1 | 1 | | | | | |
| A > B | 1 | 1 | 1 | 1 | | | | | | | | | | | | |
| C > A | 1 | | | | 1 | | 1 | 1 | 1 | | 1 | 1 | 1 | 1 | 1 | 1 |
| AS CHANGED BY BLANKS AND READ OUT B > C | | 1 | 1 | | | | | | | | | | | | | |
| A > B | | | | | | | | | | | | | | | | 1 |
| C > A | | | 1 | | | 1 | | | | 1 | | | | | | |
| ROUTING C TO | C | A | B | A | C | C | C | B | C | C | B | C | C | C | C | B |
| B TO | A | C | C | B | B | B | B | C | B | B | C | B | B | B | B | A |
| A TO | B | B | A | C | A | A | A | A | A | A | A | A | A | A | A | C |
| NEW WORD OFFERED | | | 61 | | | 13 | | | | 75 | | | | | | |
| DEMAND | | 12 | | | | | | 13 | 13 | 13 | | | | | 23 | 23 |
| WORD ENTERED IN C | | | 61 | | | 13 | | | | 75 | | | | | | |
| WORD OUT | | 12 | | | | | | | | 13 | | | | | | 23 |

FIG. 17

INVENTORS
LLEWELYN H. THOMAS
JAMES W. TONER
BY [signature]
ATTORNEY

INVENTORS
LLEWELYN H. THOMAS
JAMES W. TONER
BY John A. Hall
ATTORNEY

July 25, 1961 L. H. THOMAS ET AL 2,994,065

SELF-SORTING STORAGE DEVICES

Filed March 14, 1956 23 Sheets-Sheet 12

INVENTORS
LLEWELYN H. THOMAS
JAMES W. TONER
BY John A. Hall
ATTORNEY

July 25, 1961 L. H. THOMAS ET AL 2,994,065

SELF-SORTING STORAGE DEVICES

Filed March 14, 1956 23 Sheets-Sheet 13

INVENTORS
LLEWELYN H. THOMAS
JAMES W. TONER
BY [signature]
ATTORNEY

July 25, 1961 L. H. THOMAS ET AL 2,994,065

SELF-SORTING STORAGE DEVICES

Filed March 14, 1956 23 Sheets-Sheet 14

INVENTORS
LLEWELYN H. THOMAS
JAMES W. TONER
BY [signature]
ATTORNEY

July 25, 1961 L. H. THOMAS ET AL 2,994,065

SELF-SORTING STORAGE DEVICES

Filed March 14, 1956 23 Sheets-Sheet 15

INVENTORS
LLEWELYN H. THOMAS
JAMES W. TONER
BY [signature]
ATTORNEY

INVENTORS
LLEWELYN H. THOMAS
JAMES W. TONER
BY [signature]
ATTORNEY

July 25, 1961 L. H. THOMAS ET AL 2,994,065

SELF-SORTING STORAGE DEVICES

Filed March 14, 1956 23 Sheets-Sheet 17

INVENTORS
LLEWELYN H. THOMAS
JAMES W. TONER
BY John A. Hall
ATTORNEY

INVENTORS
LLEWELYN H. THOMAS
JAMES W. TONER
BY [signature]
ATTORNEY

July 25, 1961 L. H. THOMAS ET AL 2,994,065

SELF-SORTING STORAGE DEVICES

Filed March 14, 1956 23 Sheets-Sheet 19

INVENTORS
LLEWELYN H. THOMAS
JAMES W. TONER
BY John A. Hall
ATTORNEY

INVENTORS
LLEWELYN H. THOMAS
JAMES W. TONER
BY [signature]
ATTORNEY

SELF-SORTING STORAGE DEVICES

Filed March 14, 1956 23 Sheets-Sheet 21

INVENTORS
LLEWELYN H. THOMAS
JAMES W. TONER
BY [signature]
ATTORNEY

INVENTORS
LLEWELYN H. THOMAS
JAMES W. TONER
BY [signature]
ATTORNEY

July 25, 1961 L. H. THOMAS ET AL 2,994,065

SELF-SORTING STORAGE DEVICES

Filed March 14, 1956 23 Sheets-Sheet 23

TRANSFER SELECTION MATRIX

INVENTORS
LLEWELYN H. THOMAS
JAMES W. TONER
BY John A. Hall
ATTORNEY

2,994,065
SELF-SORTING STORAGE DEVICES

Llewelyn H. Thomas, Leonia, N.J., and James W. Toner, Poughkeepsie, N.Y., assignors to International Business Machines Corporation, New York, N.Y., a corporation of New York Filed Mar. 14, 1956, Ser. No. 571,566
13 Claims. (Cl. 340—172.5)

This invention relates to digital computers and particularly to arrangements for the storage of information introduced into the computer and information extracted therefrom with particular attention directed to increase of the average speed of access to information called for by the computer from time to time.

The object of the invention is to reduce the time of access to stored information by arranging for the sorting of items of information in such a manner that items soon to be called for will be immediately or very shortly available for use.

In accordance with this invention, where information is stored, not statically in registers at given addresses, but in so-called delay lines where there is continuous movement, certain switching arrangements are provided whereby the items of information in their movement will be continuously interchanged in their order of appearance so that those items whose use is next anticipated will be next or most readily accessible. In accordance with the present invention each item of information is tagged with an identification or usage number rather than assigned to a particular address where it may be found and this identification becomes part of the "word" and remains with it throughout its various movements through the storage delay lines and the switching circuitry until the item is used in the regular operations of the computer.

The identifications are chosen by the programmer in such a manner that the ordered set of identifications of all words in storage represents the order in which the words are to be withdrawn therefrom. When a new item of information is introduced into storage, sorting takes place until such new word is included in its proper order in accordance with the magnitude of its identification or usage number, and when an item is withdrawn from storage either a blank is left in its place, a new word is entered, or a sorting movement is made.

Specifically, in accordance with the present invention, the movement of the items of information through the different lines of the storage is synchronized so that as corresponding parts of the various items emerge from storage, such parts appear concurrently and are therefore subject to comparison, one with another. Since each is different, no single identification or usage number being used more than once, it is a simple matter to determine which of any given pair of two is the greater.

For purposes of example, let us assume a very simple system having a short line A where the items of information having the low value usage numbers are collected, a medium length line B where the items of information having the intermediate value usage numbers are collected, and a long line C where the items of information having the greatest value usage numbers are collected. It will then be obvious that when these items have been completely sorted that the usage numbers in line B will be greater than the usage numbers in line A, and, to put it shortly, C will be greater than B, and C will be greater than A. When this ideal state has been reached no further sorting will take place until the pattern of moving numbers has been changed, through the introduction of a new number, the withdrawal of one of the present numbers or a combination of these occurrences.

While it might be desirable to sort the items of information within a line so that upon the withdrawal of an item from a shorter line, such as A, no further sorting would be necessary, the additional cost and complication of the means necessary is not to be justified from a practical and economical standpoint, but it must be observed that complete sorting in which every item in storage is put into its proper order is within the spirit of the invention.

A feature of the invention is a so-called Greater Magnitude Detection circuit which produces an output signal when a particular one of two inputs is greater in value than the other. It will be noted that the items of information, each including its identification or usage number are always in movement so that the usage number emerges first, its tens digit first and its units digit second (where a simple two digit number described herein by way of example is used). Also these two digits are expressed in the binary decimal code and the bits emerge in the order, the 8 bit, the 4 bit, the 2 bit and the 1 bit. It will therefore be obvious that where two such numbers are being compared, that one which first shows a bit unmatched by the other is the larger. This GMD circuit therefore may have two inputs, one from line A and one from line B and will produce an output only when A is greater than B. The other combination, B is greater than A could as easily be produced but is not necessary as three signals $A>B$, $B>C$ and $C>A$, are sufficient to control the routing for sorting purpose.

Another feature of the invention is a transfer selection matrix which responds to signals on one or more of three input terminals to direct numbers emerging from three storage lines back into said three storage lines in the same or in different orders. Where, by way of example, it appears that the number in line C is greater than the number in line A, and the number in line A is greater than the number in line B, then the number in line C will be returned to line C, the number in line B will be put into line A, and the number in line A will be put into line B, thus effectively interchanging the numbers in lines A and B.

A feature of the invention may therefore be stated as the combination of a plurality of storage lines each having an output and an input, means for comparing each of said outputs with the other and means responsive to said output comparing means for effectively interconnecting said outputs and said inputs in various patterns.

Another feature of the invention is a means to sense a usage number at such a time in its movements that its progress and the routing of the word including such usage number or identification will not be delayed. Each storage line is of a length to accommodate an exact number of words and the circuitry is so arranged that at the instant that the first bit of one word or the time interval which might encompass such bit has emerged over the output of the line the first bit of another word has entered the line through its input. Since the routing of a word emerging from a delay line must have been determined and the circuitry properly adjusted to effect such routing at the exact time that such first bit emerges, means must be provided to examine the usage number thereof prior to that time. Accordingly the actual length of the line is made short by a length sufficient to store the usage number (herein by way of example, eight microseconds) and then the output path from the line is divided, one branch going to the circuitry for observing the emerging usage number and another branch entering an eight microsecond delay circuit. It will then be obvious that as the emerging usage number becomes fully available for test and comparison that it, as the actual head of the word, will just begin to emerge from the said eight microsecond delay circuit from which it will be properly routed. This eight microsecond delay is then to be considered as part of the actual delay line, which as pointed out hereinbefore is of precisely the proper length to store a given number of words. Thus means is provided to preview the identity of a word immediately prior to its emergence from storage so that arrangements for its proper disposition may be made.

Another feature of the invention is the use of a plurality of different length delay lines for storage purposes whereby more complete sorting of the moving words may be achieved since in the shorter lines the appearance and the reappearance of any given word occurs at a higher rate than the appearance and reappearance of a given word in a longer line. It is furthermore of advantage in order to effect more complete sorting to avoid the use of different length delay lines having a common factor or denominator for where a common denominator exists the words will tend to become grouped in as many groups as the value of this common denominator which might impede the progress of a low value usage number to a shorter line where its time of access is the shortest.

Another feature of the invention is a means for changing the normal sorting pattern determined by the relative magnitudes of the usage numbers at the head of the words emerging from storage, to a special sorting pattern in which a number being read out of any given storage line will switch the blank left thereby to a particular storage line designated as the receiver of a new word whereby if a new word is awaiting admission to storage it will be read in while the first said word is being read out.

Put in the terms of the specific example herein set forth, where the short line A, the medium length line B, and the long line C are provided for storage and where in sorting, the output of each is switched to the input of another in various patterns, this pattern if not at the time suitable is changed to another suitable pattern responsive to the operation of reading out a word from any given one of said lines whereby the blank created by the said reading out is switched to the input of the C line and a blank entered therein. The C line is the one arranged to receive any new word awaiting entry so that if there is such a new word it will be simultaneously entered in this C line. Since the entry of a blank will not interfere with or mutilate another word simultaneously being entered, such new word will be properly entered or a blank will be otherwise entered in the C line.

If a new word is not available for entry and a blank is thus entered in the C line, then when a new word is offered for entry it will have to wait until a blank is encountered, whereupon it is entered.

Now let us suppose the worst possible conditions in which a new word is offered for entry just after a blank has been passed and in the following sorting cycle a demand is made for this particular new word. The signal for reading out a word is the offer of its usage number simultaneously to all the read out comparison circuits so that when this particular usage number appears, that word will be read out (and into that part of the calculator where it is required). But under conditions stated such usage number is not in storage and hence a number of sorting cycles will have to be performed until a blank appears so that the word offered for storage may be entered and then another plurality of sorting cycles will have to be performed until its usage number is sensed by one of the comparison circuits. If, in storage, there is but a single blank in movement the maximum access time will thus be required, but it will be understood that this example is pointed out as an extreme condition and is not likely to occur except through negligence on the part of the programmer. If any appreciable time elapses after a number has been entered in the longest delay line and such number has a very low valued usage number, it will gravitate in short order to the shortest length delay line where the minimum access time will apply.

A feature of the invention is the use of blank detector circuits associated with the GMD (Greater Magnitude Detection) circuits which artificially make a blank or a 00 usage number appear to be greater than any other number. Through this stratagem the blanks as they occur through the withdrawal of numbers from storage move to the longest delay line and remain there awaiting the entry of new words and since words newly offered for storage always enter such longest line, room is thus immediately made for any such words that may be awaiting entry.

A feature of the invention may then be stated as the circuits for controlling a normal disposition of words emerging from storage and a plurality of blank detectors and comparison circuits, which when successful produce a blank, for changing such normal disposition so as to sort a blank into the longest delay line. By way of example, where $C=94$, $B=35$, and $A=12$, the normal operation of the GMD circuits would be to route each of these numbers back into the same lines. However, if a demand has been made for the word with the usage number 12, the A read out comparison circuit would operate to change this normal disposition so that the output of A would be connected to the input of C, the output of B would be connected to the input of A, and the output of C would be connected to the input of B.

Thus it will be seen that words in storage, constantly moving through the storage delay lines are constantly being rearranged in order in such manner that those which will be demanded first will be accorded the shortest access time.

Another feature of the invention is a combination of a delay line for storage consisting partly of a medium in which the transmission of signals therethrough is delayed by the inherent properties of the medium and partly by electronic circuit means. It will appear hereinafter that a so-called mercury delay line is used for the first part in which the speed of propagation of the signals therethrough is a function of the properties of the medium, e.g. mercury. The second part is made up of a cascade of standard Havens delay circuits which have been constructed and arranged to operate on a microsecond basis. The signal input to this second part therefore must be on the basis of one bit per microsecond, and therefore regardless of the speed of propagation of the signals through the mercury of the first part must be fed into the input of the mercury delay line at a time spacing of one bit per microsecond, the length of the mercury line being chosen accordingly.

A feature of the invention therefore may be stated as a composite signal delay line consisting of two parts, one of which determines the rate at which signals may be introduced into the delay line for transmission therethrough.

Other features will appear hereinafter.

The drawings consist of twenty-three sheets having thirty-two figures, as follows.

Figures 10, 15:
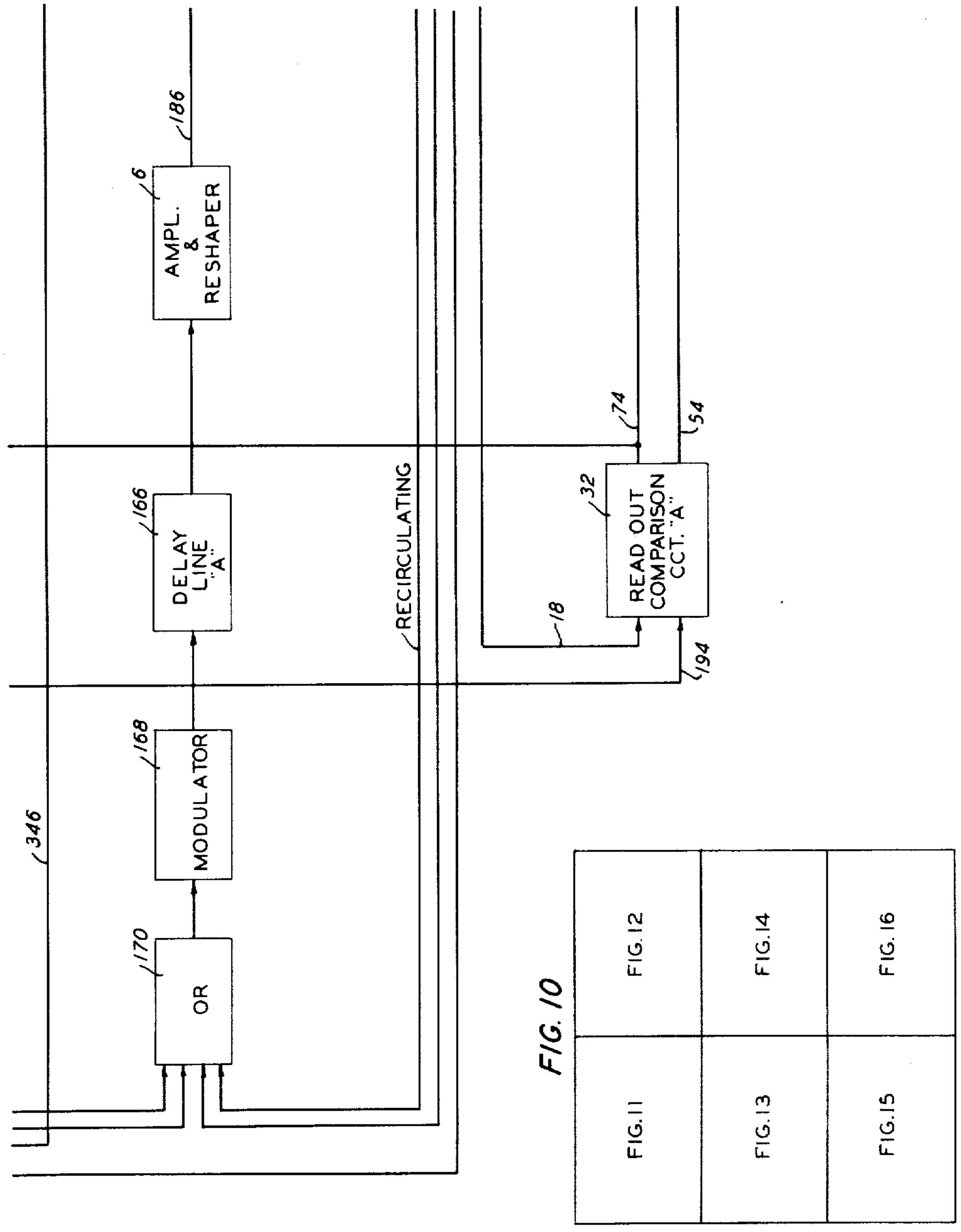
FIG. 10 is a block diagram showing how FIGURES 11 to 16 inclusive may be placed to show a logical circuit diagram of a self-sorting system sufficiently extensive to explain the principles of the present invention.
Figure 11:
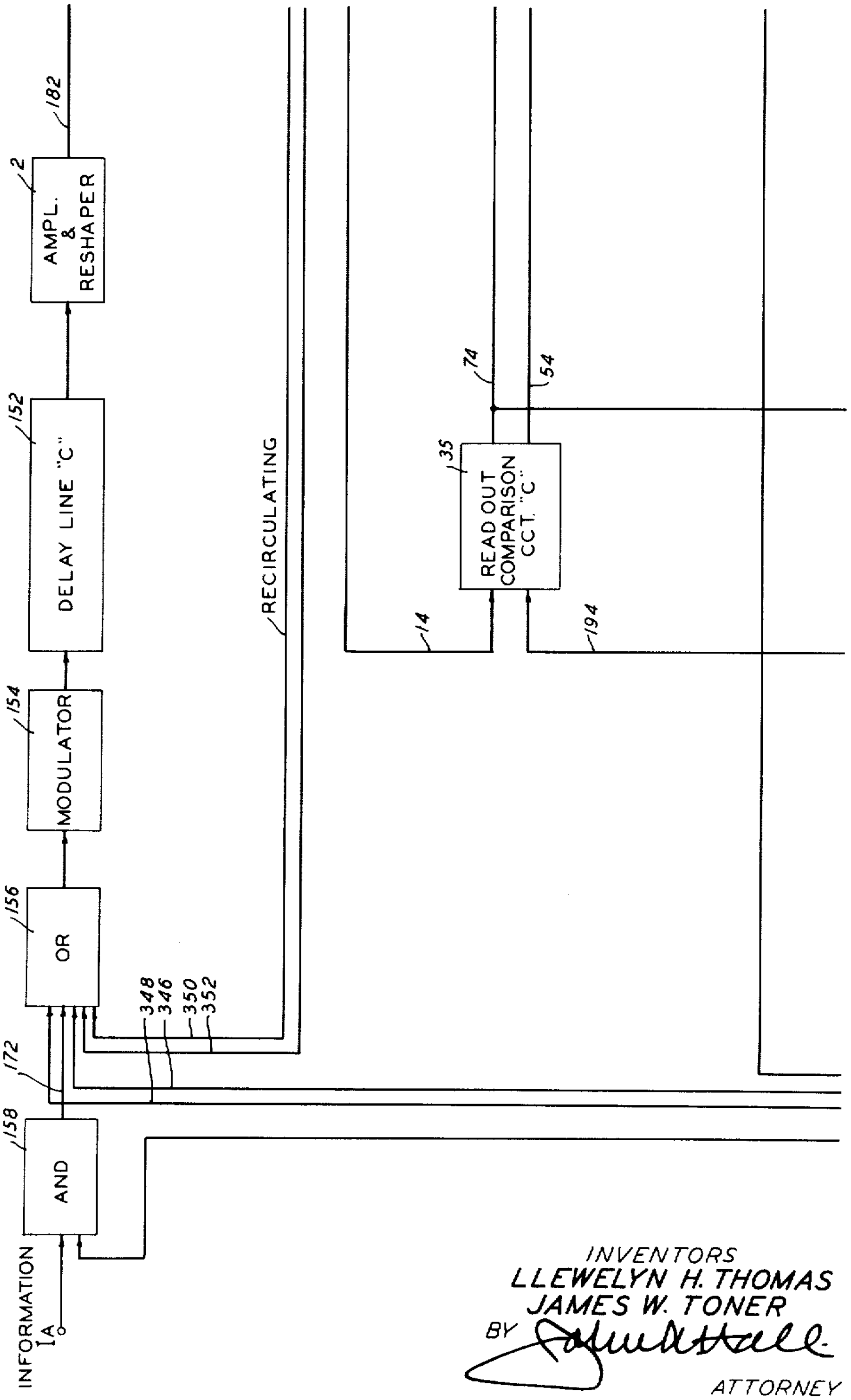
FIGS. 11 and 12 show the arrangements of the components for the longest delay line C.
Figure 12:
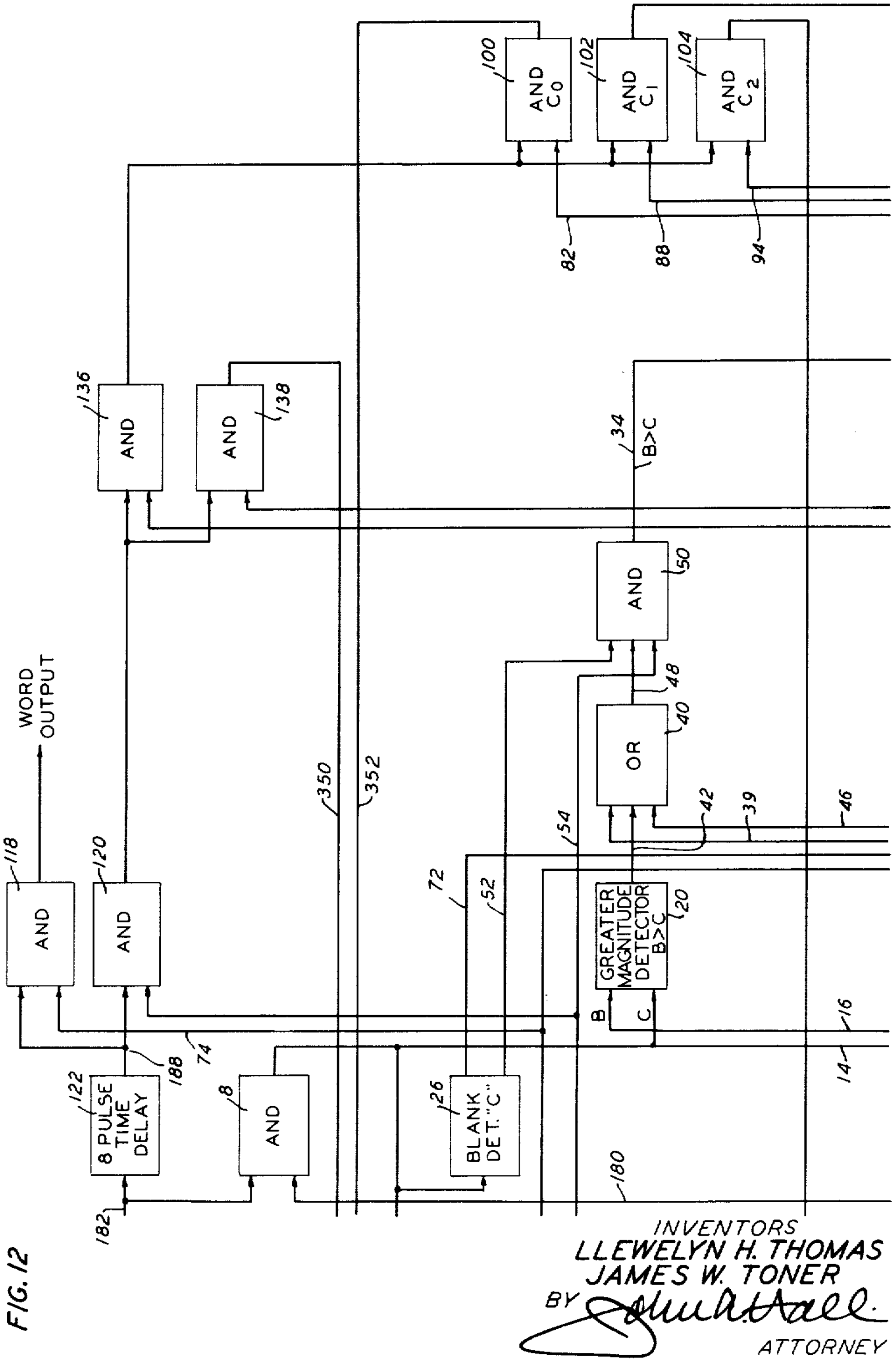
Figure 13:
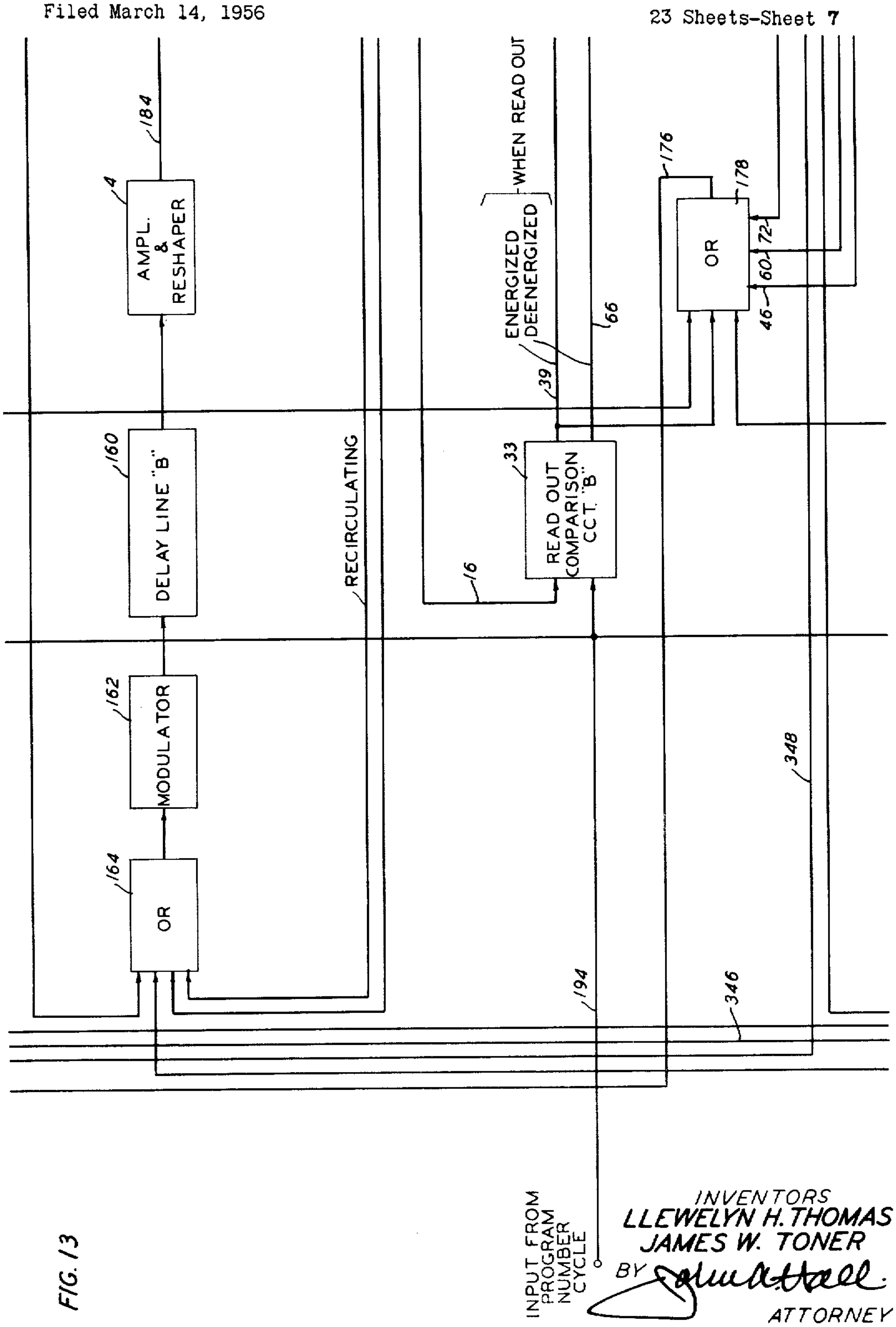
Figure 14:
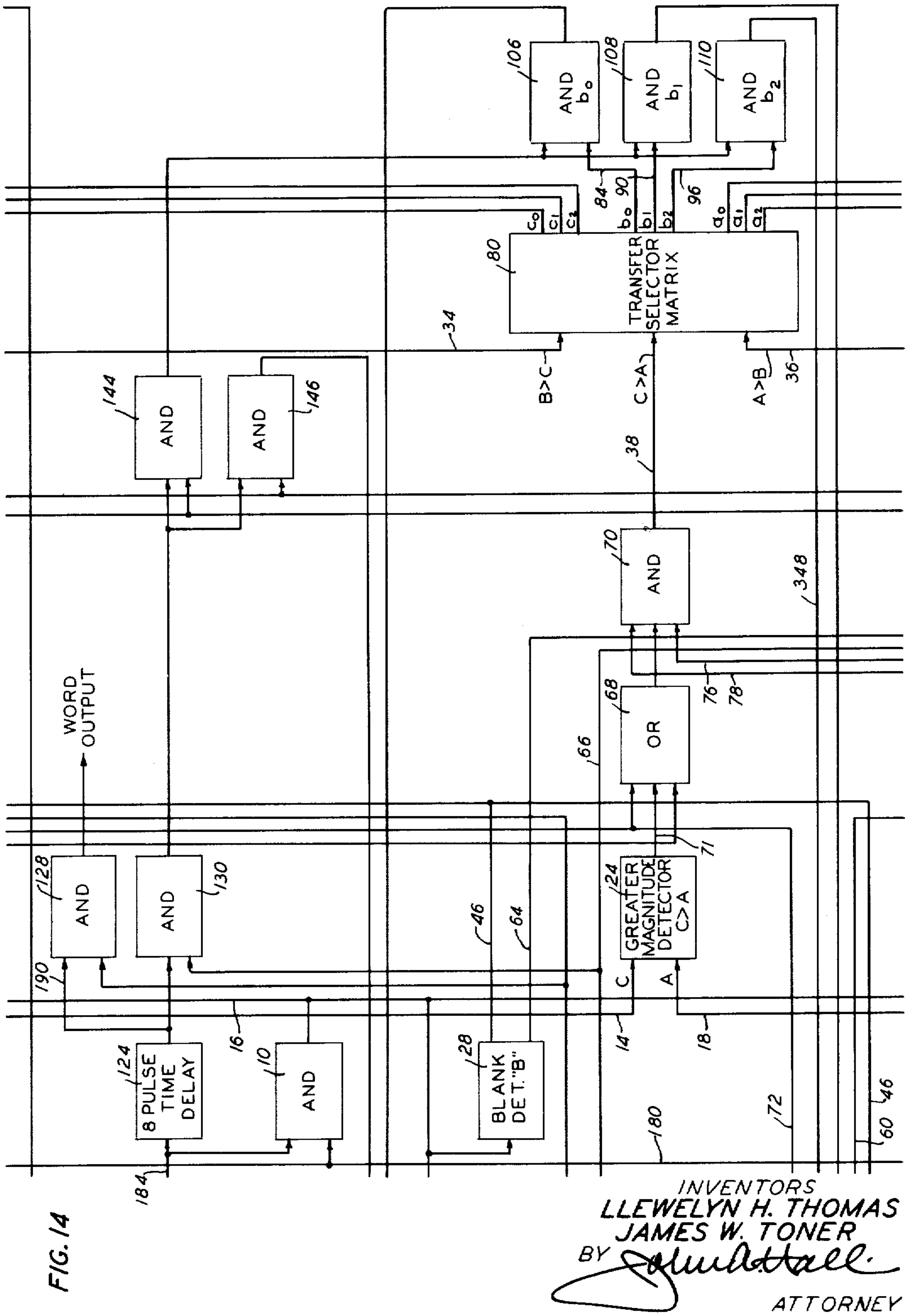
Figure 16:
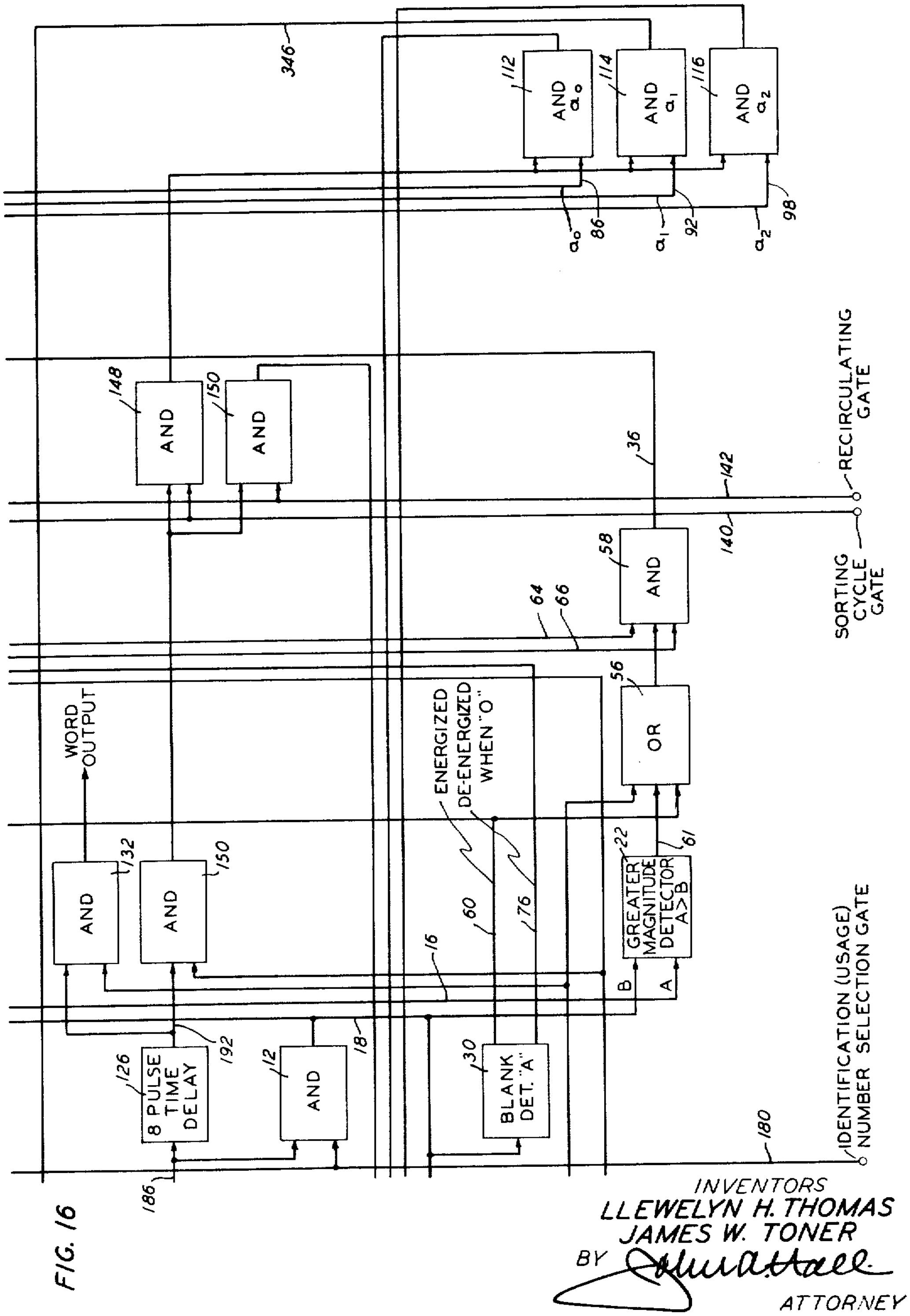
Figure 19:
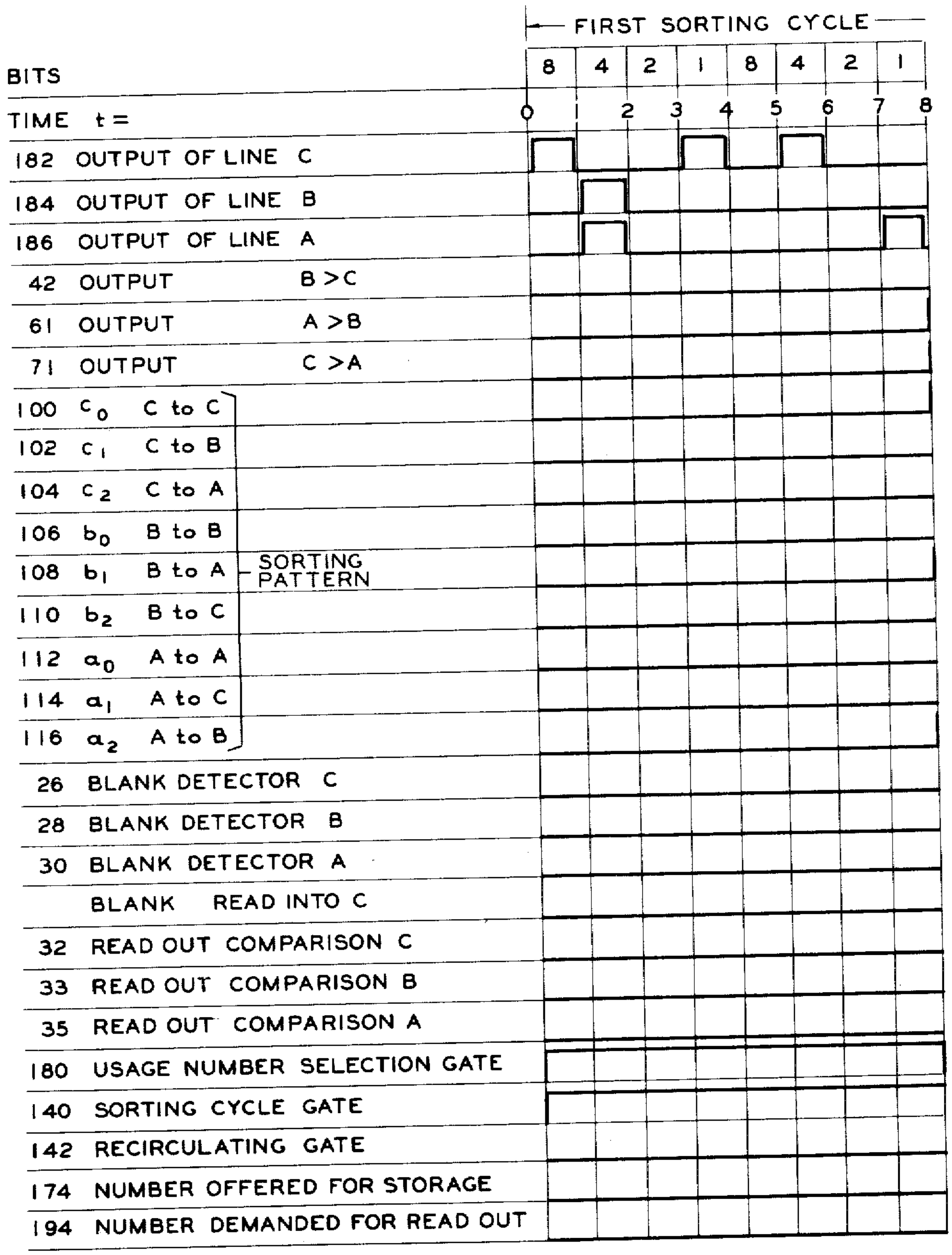
Figure 18:
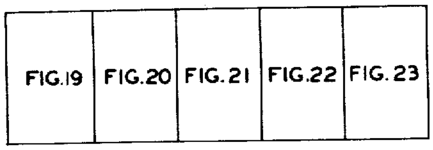
Figure 20:
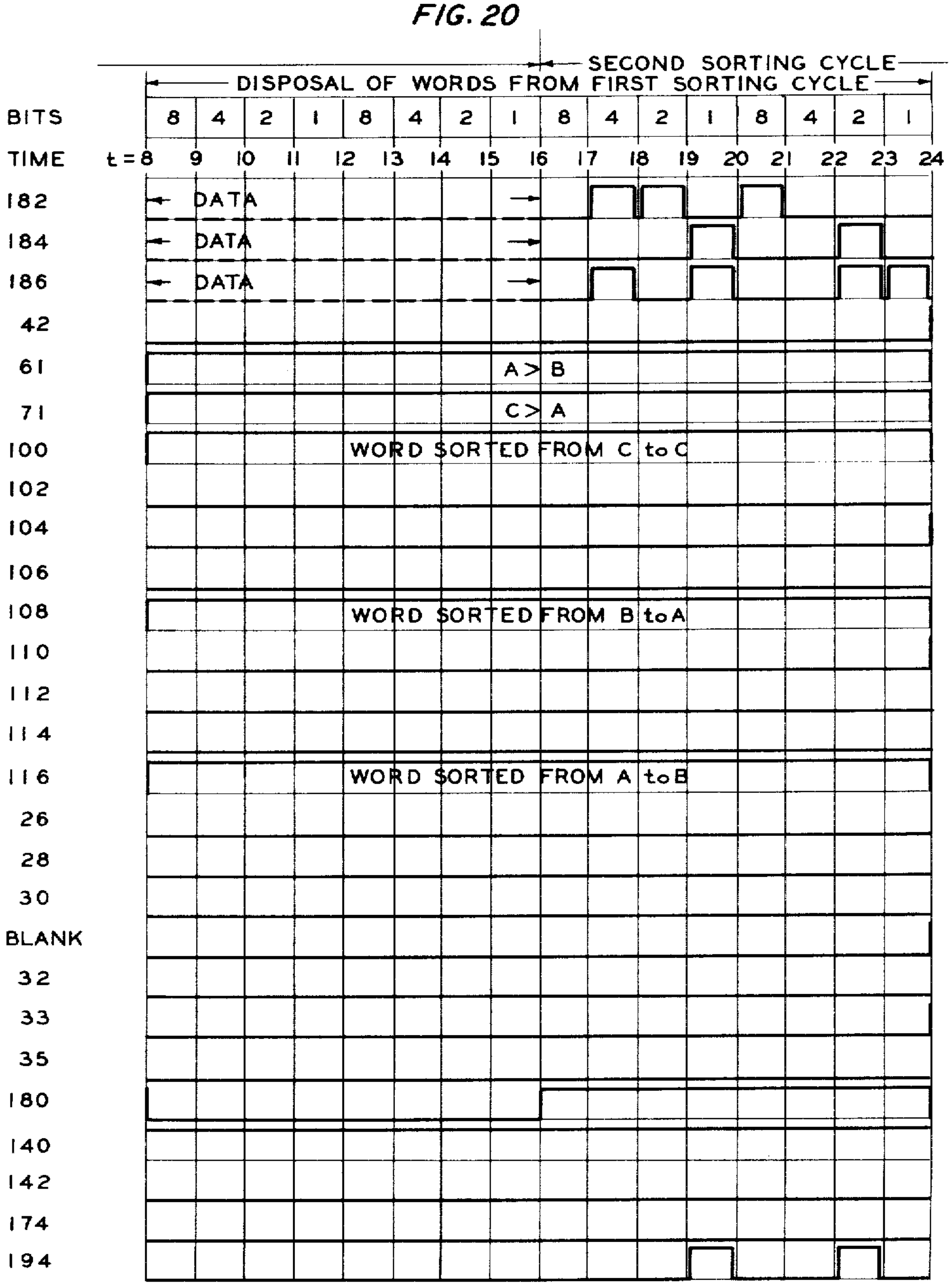
Figure 21:
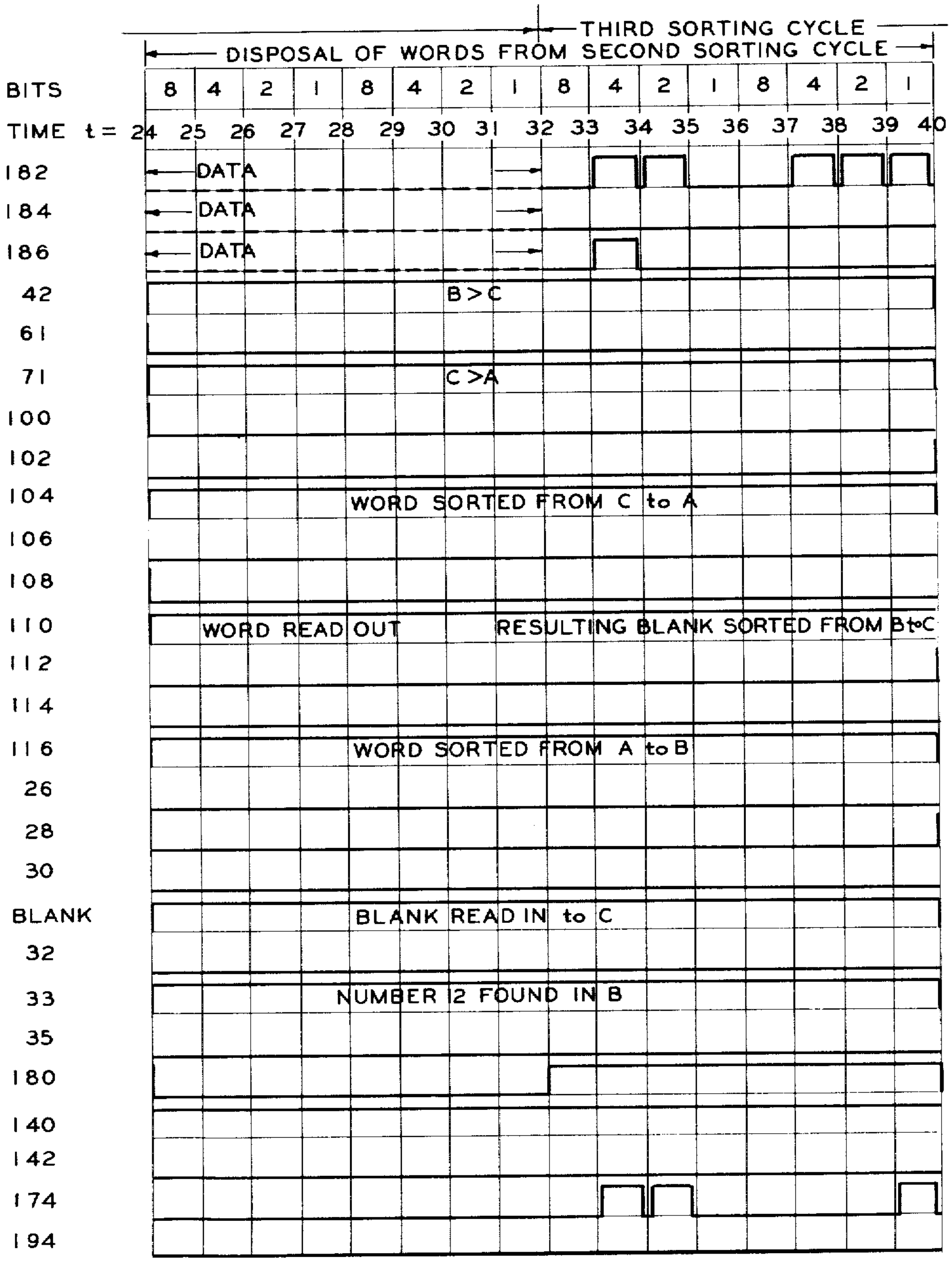
Figure 22:
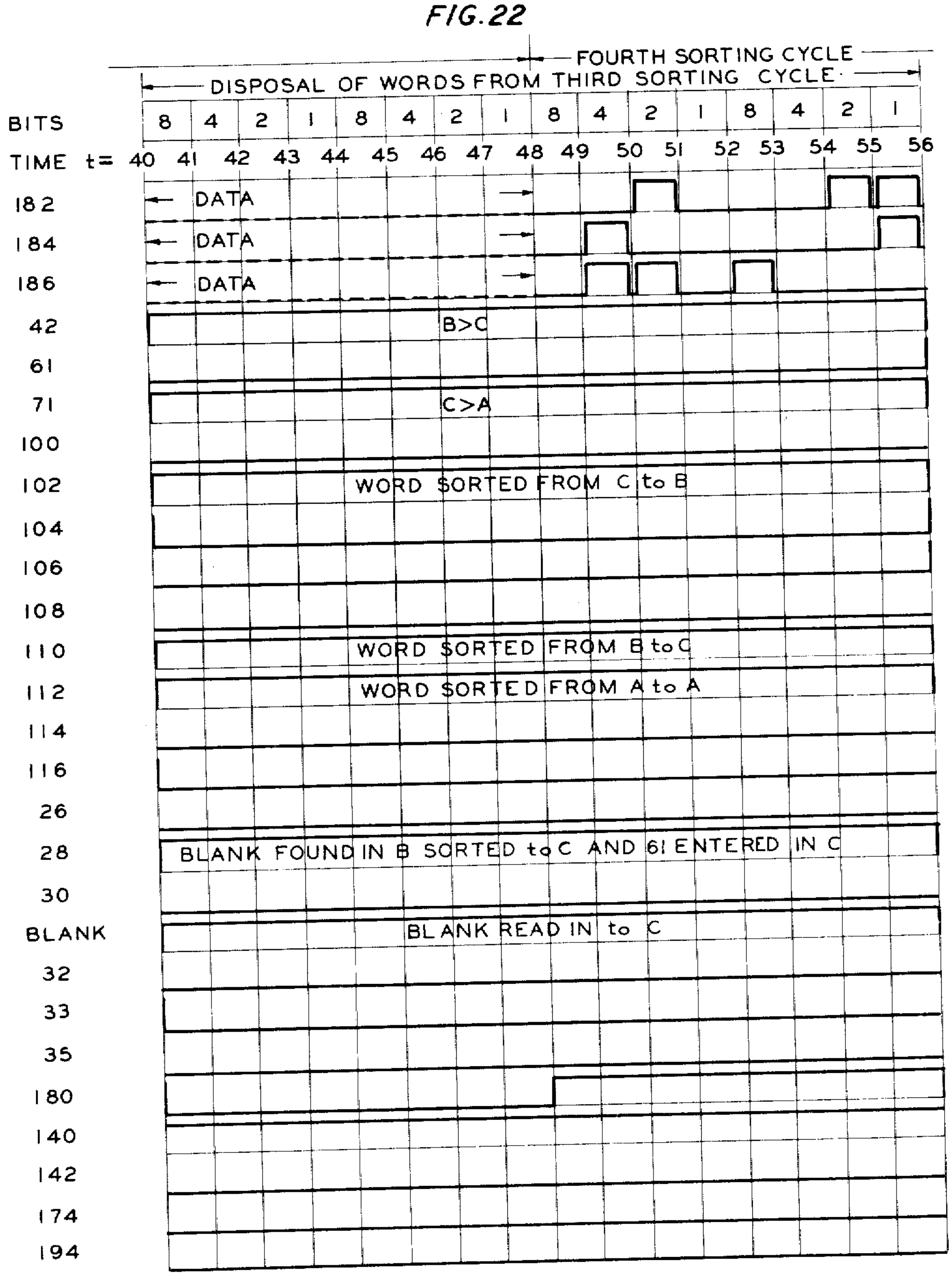
Figure 23:
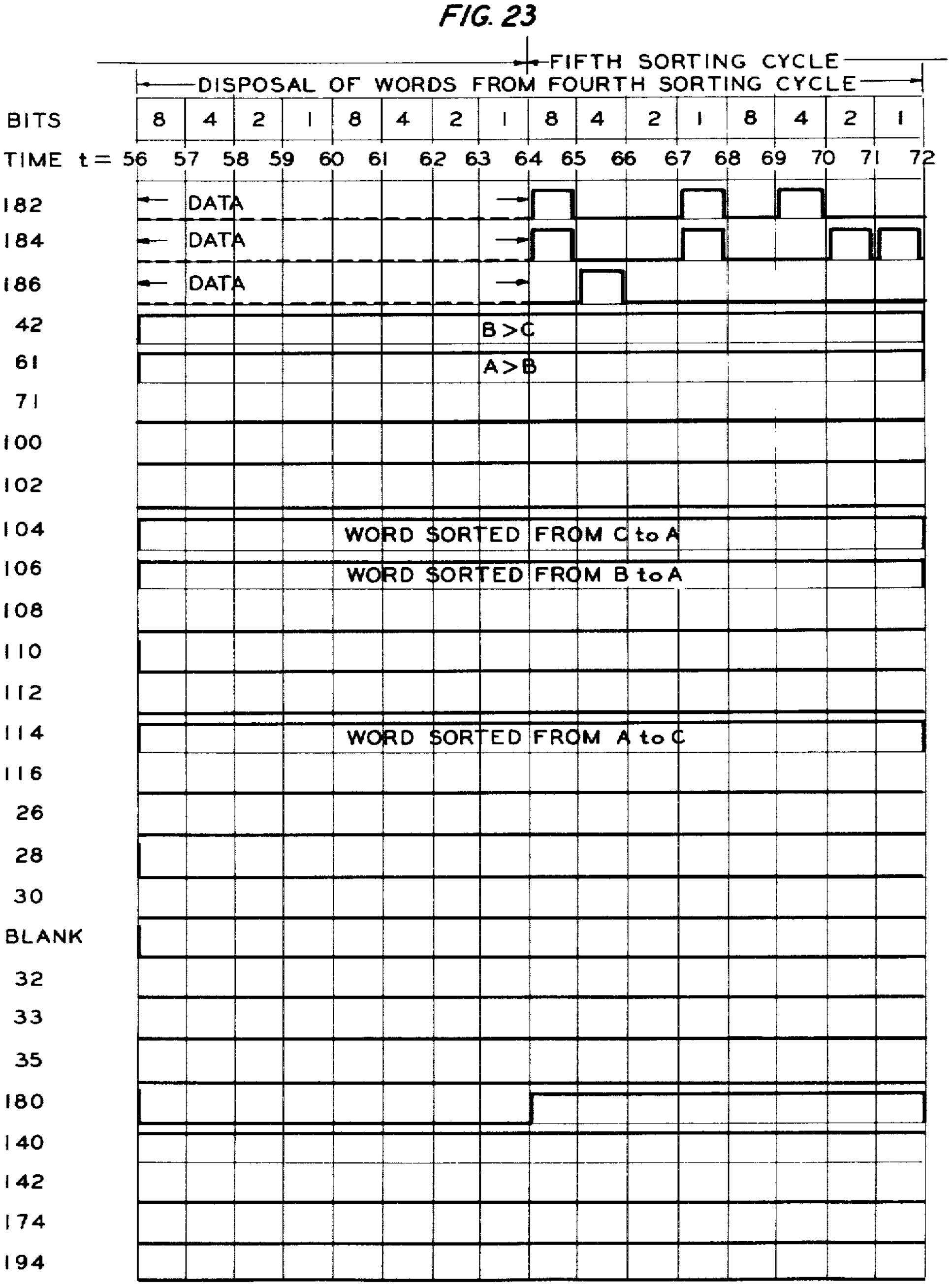
Figures 24, 25:
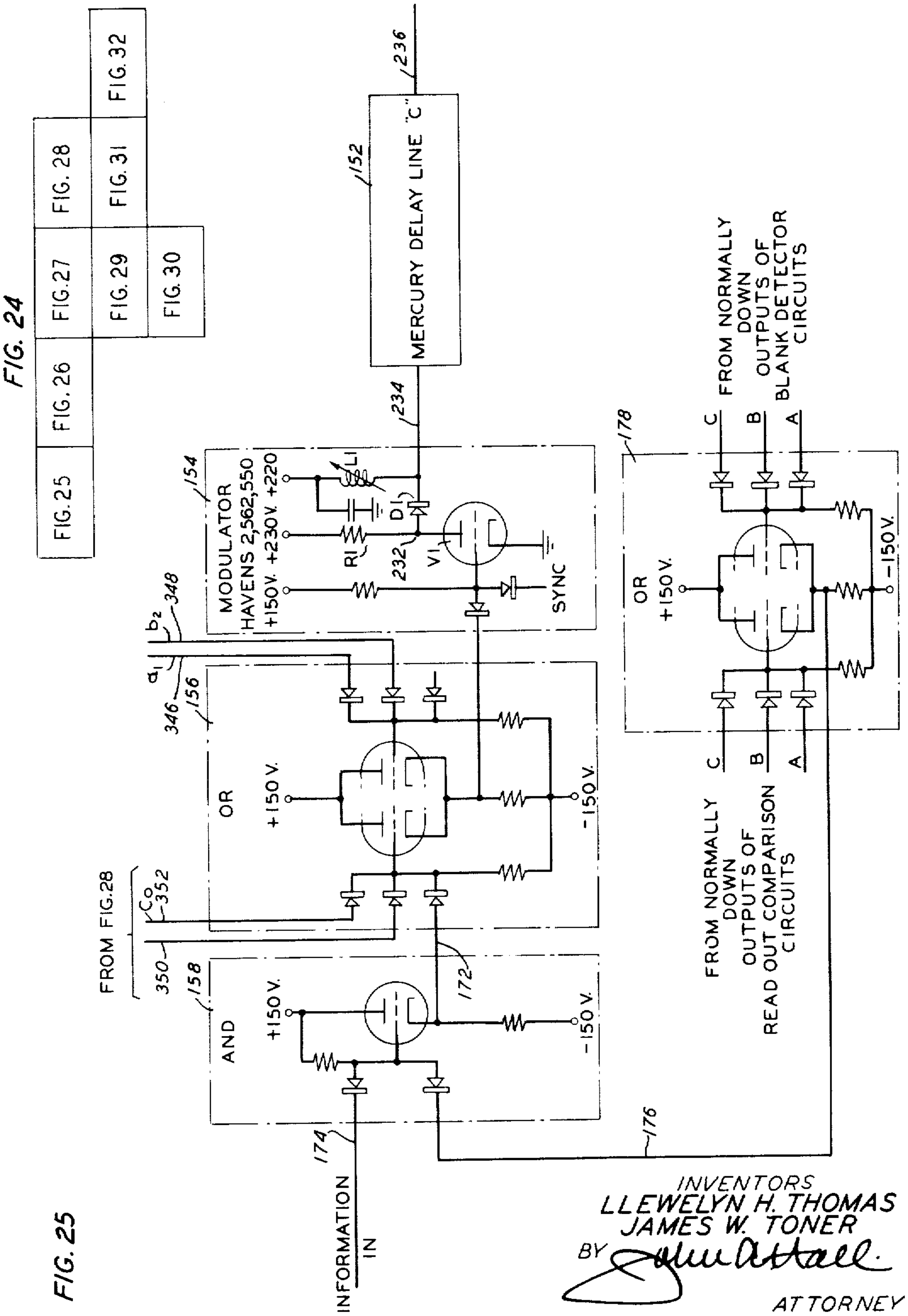
Figure 26:
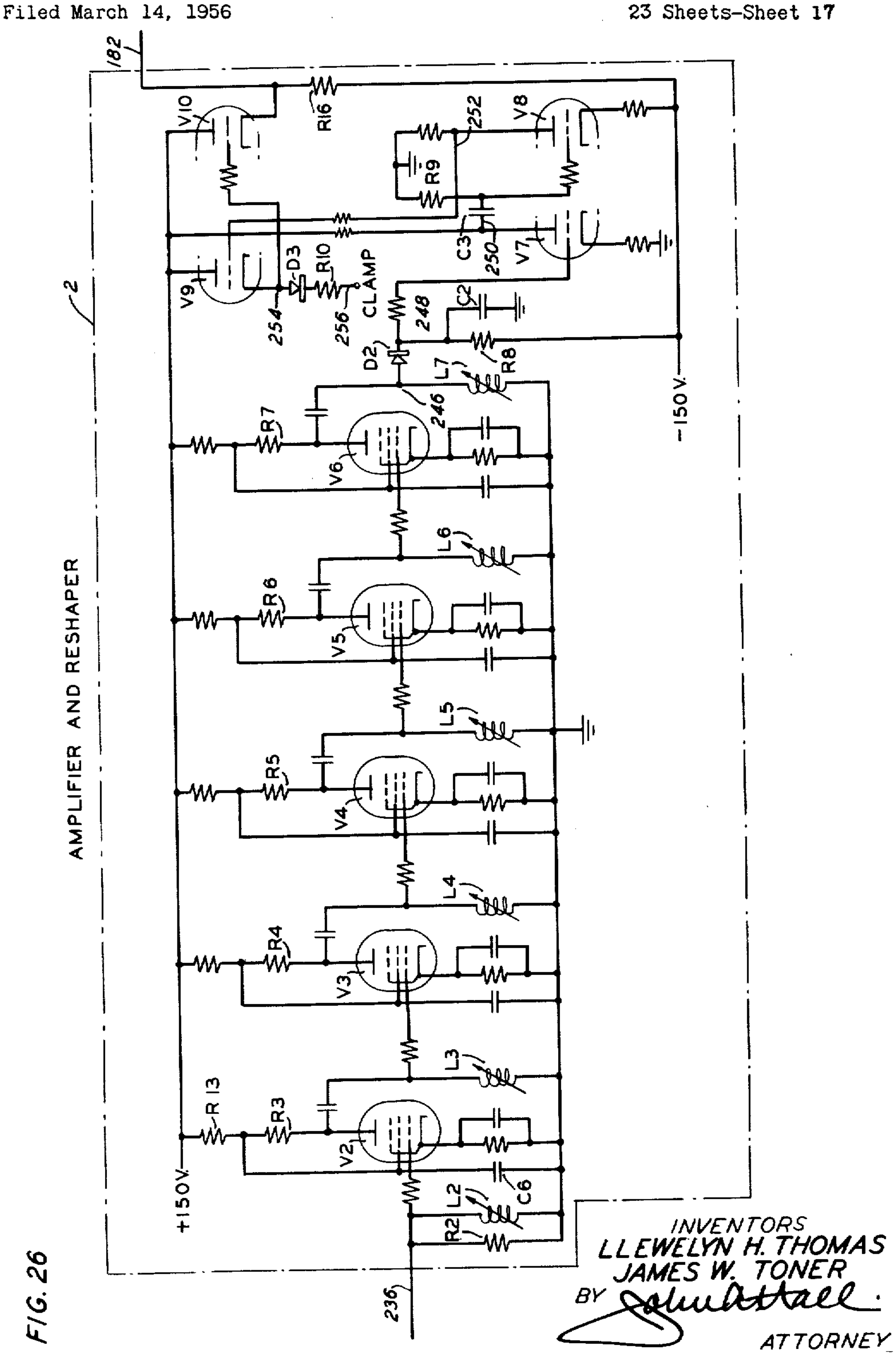
Figure 27:
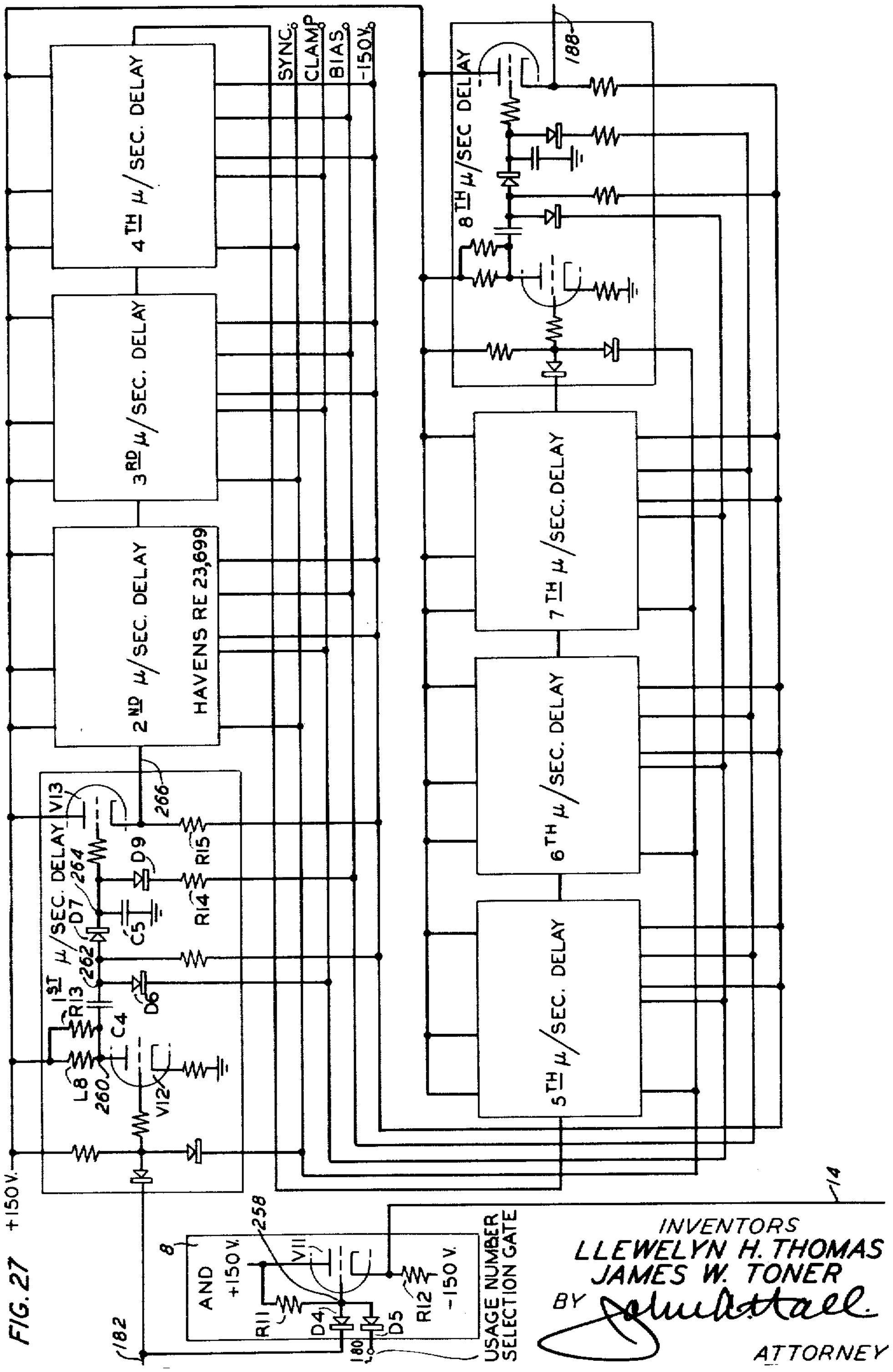
Figure 28:
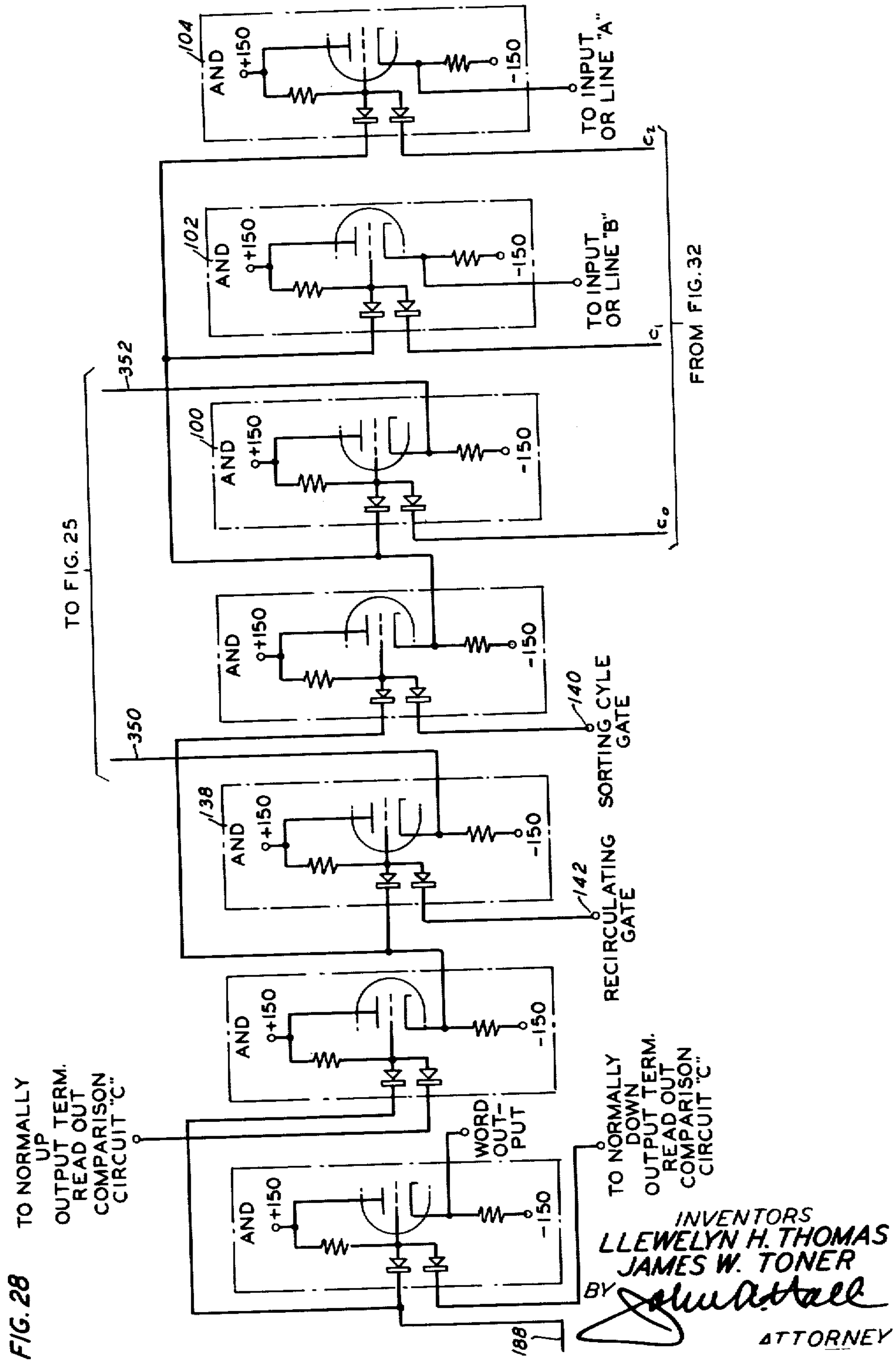
Figure 29:
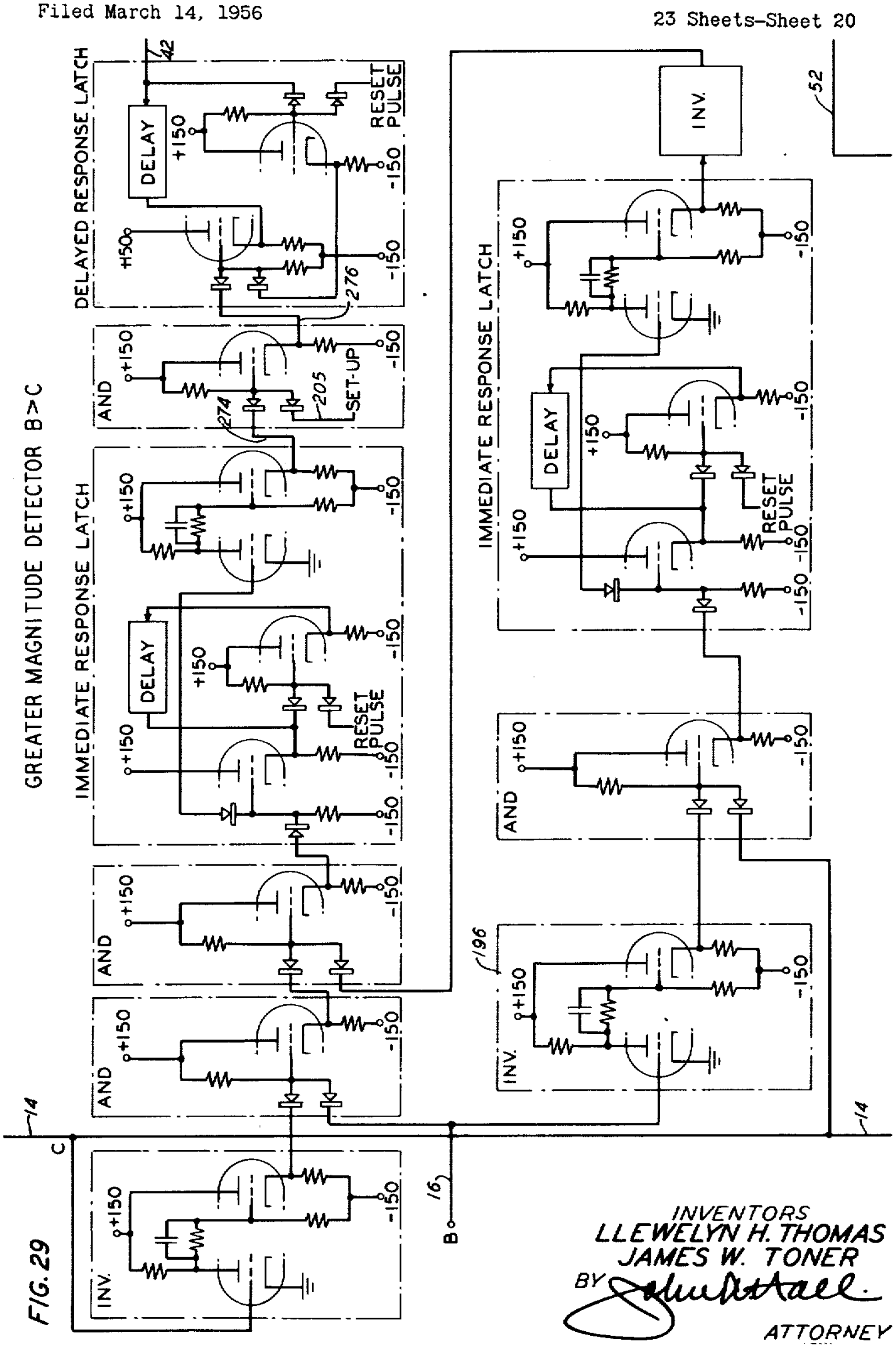
Figure 30:
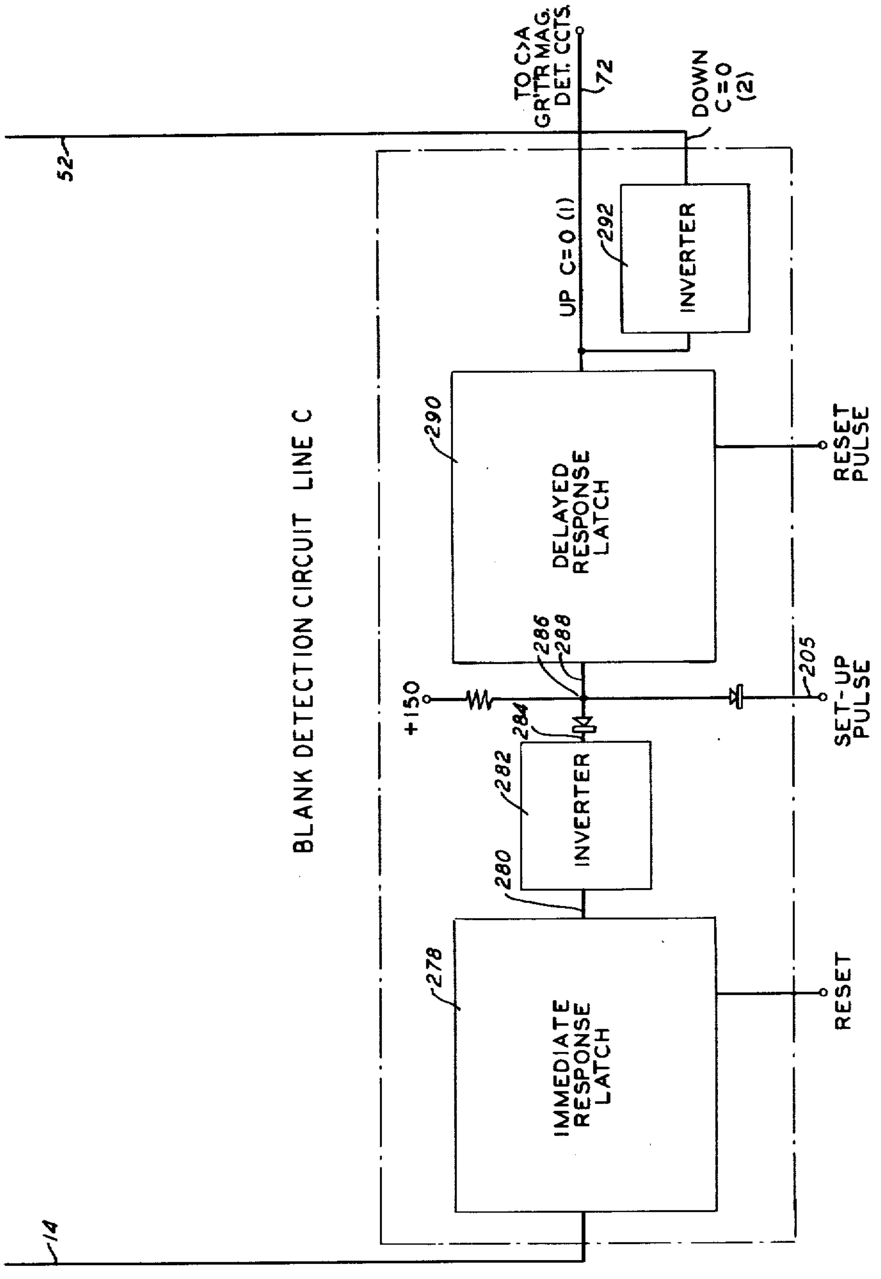
Figure 31:
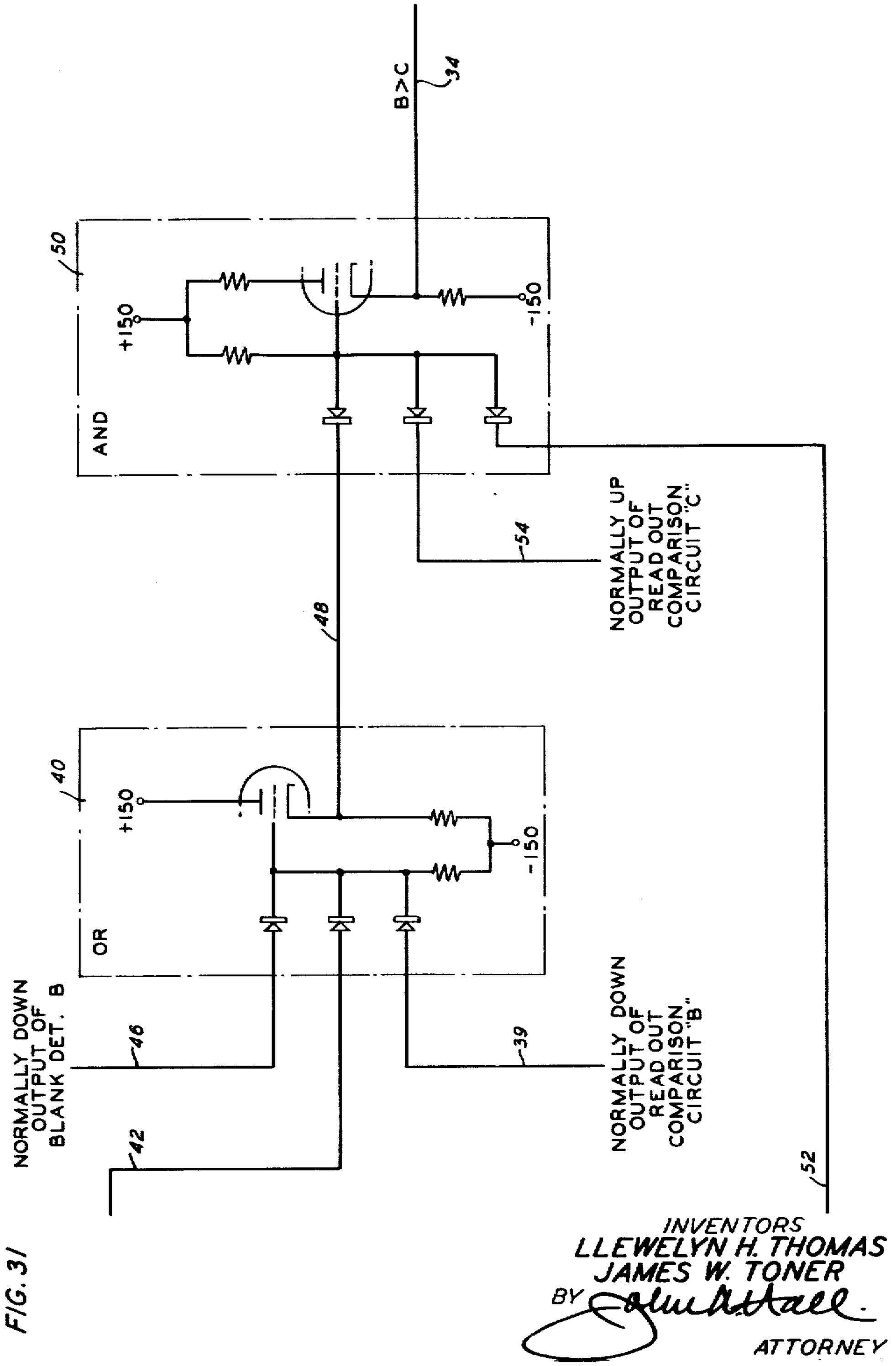
Figure 32:
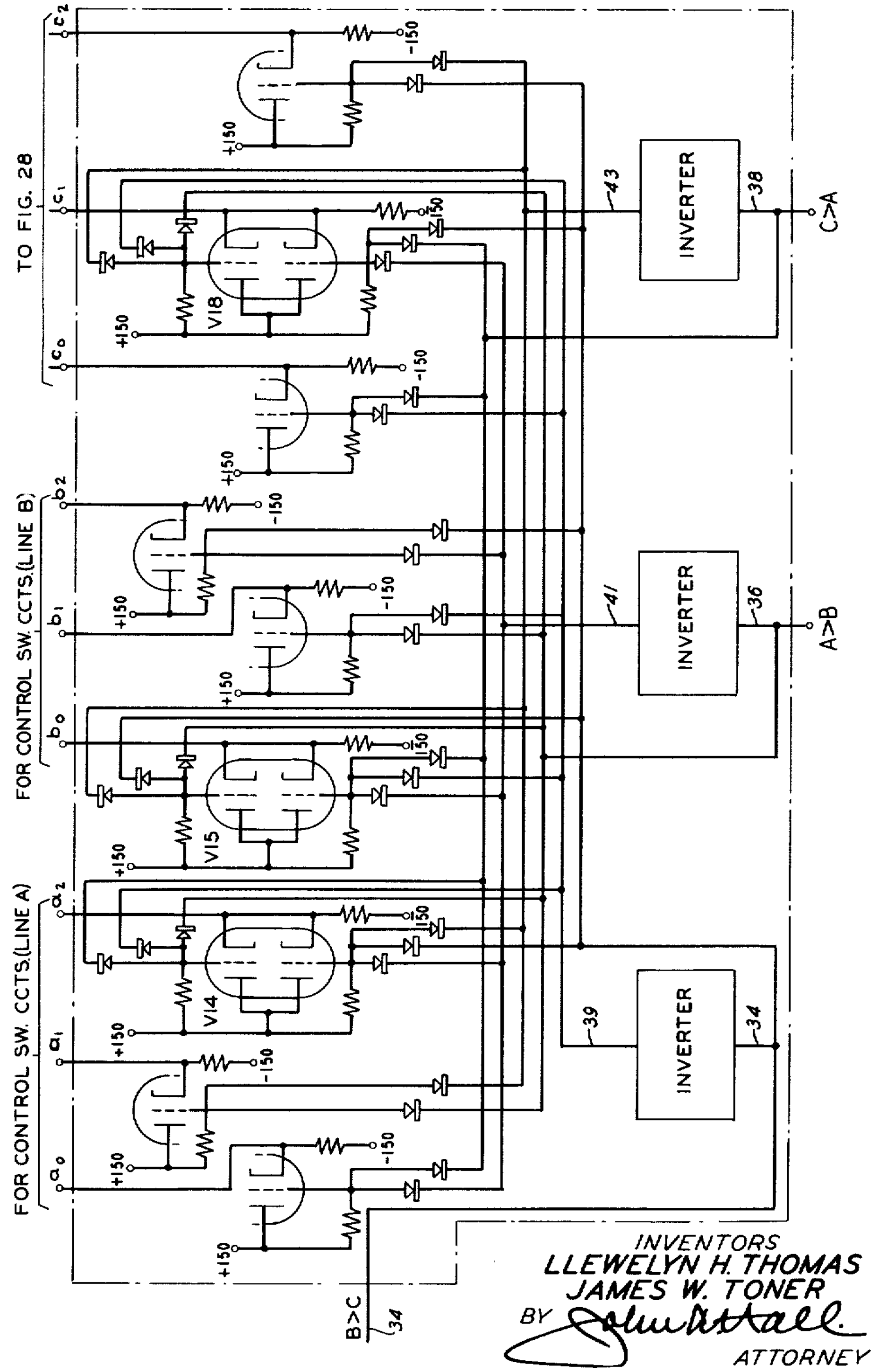

FIG. 11 showing the delay line C with its input modulator and its output amplifier and pulse reshaper and its read out comparison circuit; and FIG. 12 showing the sort control circuits associated with this line;

FIGS. 13 and 14 show arrangements similar to those of FIGS. 11 and 12, as provided for the intermediate length delay line B; and FIGS. 15 and 16 show arrangements similar to those of FIGURES 11 and 12 as provided for the shortest length line A;

FIG. 17 is a sequence chart depicting the disposition of certain words assumed to be in storage, other words offered for storage and still others demanded for read out over a plurality of sorting cycles;

FIG. 18 is a block diagram showing how FIGURES 19 to 23 inclusive may be placed to form a time chart showing the first five sorting cycles of FIG. 17 and the disposal of the sorted words of the first four of such cycles;

FIG. 19 is a time chart of the first sorting cycle (of FIG. 17);

FIG. 20 is a time chart of the second sorting cycle (of FIG. 17) and the disposal of the sorted words resulting from the first sorting cycle;

FIG. 21 is a time chart of the third sorting cycle (of FIG. 17) and the disposal of the sorted words resulting from the second sorting cycle;

FIG. 22 is a time chart of the fourth sorting cycle (of FIG. 17) and the disposal of the sorted words resulting from the third sorting cycle;

FIG. 23 is a time chart of the fifth sorting cycle (of FIG. 17) and the disposal of the sorted words resulting from the fourth sorting cycle;

FIG. 24 is a block diagram showing how FIGURES 25 to 32 inclusive may be placed to form a schematic circuit diagram of the arrangements for one delay line, particularly the elements shown in FIGURES 11 and 12;

FIG. 25 is a schematic circuit diagram of the new information input AND circuit, the delay line OR circuit, the modulator for entering information into the delay line, a representation of a mercury delay line and the OR circuit used to control the new information input AND circuit;

FIG. 26 is a schematic circuit diagram of the amplifier and pulse shaper placed at the outgoing end of the mercury delay line;

FIG. 27 is a schematic circuit diagram showing the construction of the 8 pulse time delay which forms part of the storage delay but which is used so that information moving through such delay may be previewed eight pulse times before it emerges into the sorting network;

FIG. 28 is a schematic circuit diagram showing a plurality of AND circuits constituting the sorting network;

FIG. 29 is a schematic circuit diagram of a Greater Magnitude Detector circuit (GMD $B>C$);

FIG. 30 is a schematic circuit diagram of a Blank Detection circuit;

FIG. 31 is a schematic circuit diagram of the circuitry between the GMD circuit and the transfer selection matrix showing how the normal response may be changed by the operation of a Blank Detection Circuit or a Read Out Comparison circuit; and FIG. 32 is a schematic circuit diagram of the transfer selection matrix.

In order to have a clear understanding of the operation of the circuits of the present invention, it will be helpful to have a general understanding of certain logical circuit electronic components and certain terminology employed in connection with these components.

Attention is called to the Havens Reissue Patent Re. 23,699, issued August 18, 1953, to Byron L. Havens, which completely discloses what may be referred to hereinafter as a standard one microsecond delay. Such a delay circuit is used to reshape a pulse transmitted in a given time interval in the following time interval. Actually a pulse transmitted in a given time interval, even though deformed, will trigger this delay circuit which will thereupon transmit a perfectly shaped output pulse the following microsecond.

This delay circuit depends on the use of a precisely controlled one megacycle source of frequency from which certain synchronizing pulses and clamping potentials are derived all in accordance with the disclosure in the application Serial Number 444,251, filed July 19, 1954, by Charles R. Borders.

Patent 2,562,550, issued to B. L. Havens discloses a "Ringing Oscillator," a device useful as a modulator for a delay line which will be more fully disclosed hereinafter.

The specifications and subject matter of these patents and applications are incorporated herein as part of this application as though they were fully set forth in the body of this specification.

In the following description, certain terms are used and many basic circuit components are mentioned, all of which are set forth in the prior art and some which are shortly described as follows.

A time interval is one microsecond. A time interval may, of course, be of any convenient value but the circuits of the present invention have been constructed and arranged to operate on a megacycle basis. A circuit such as the standard one microsecond delay may be altered to work on any other time interval desired through the alteration of certain component values without departing from the spirit of the invention.

UP and DOWN refer to potentials. In this electronic maze, each component, such for instance as a tube circuit, is arranged to be active when the potential on its control conductor is UP and inactive when such potential is DOWN. Generally, as in a cathode follower circuit, when the potential on an input terminal is UP, the potential on the output terminal is UP and likewise, when the potential on the input terminal is DOWN the potential on the output terminal is DOWN. It may be stated, merely by way if example, that a potential of plus 5 volts or more will constitute an UP condition and a potential of minus 30 volts or less will constitute a DOWN condition. UP means that the voltage present at a particular point is positive with respect to ground and DOWN means that the voltage present is negative with respect to ground. If the control grid of a vacuum tube is referred to as DOWN, it generally means that the voltage at that control grid is below the cutoff value of the vacuum tube.

Numerous coinicidence circuits are employed herein. And AND circuit refers to a circuit which is operable to produce an UP condition on its output terminal only when all of its input terminals are UP. Such an AND circuit may be constructed of a number of diodes all poled to hold the output terminal DOWN until all of the inputs are UP or it may be constructed of a tube such as a pentode where the control grid and the suppressor grid must both be UP to produce conduction in the tube. An OR circuit refers to a circuit operable to produce an UP condition on its output terminal when any one or another or more of its input terminals are UP.

In the logical diagrams forming part of the present disclosure an AND circuit is shown as a rectangle drawn about the designation AND and having a plurality of input terminals and a single output terminal. An OR circuit is similarly shown.

A cathode follower circuit is a tube circuit having its anode firmly tied to a potential source positive in relation to the cathode or otherwise arranged so that the grid constitutes an input and the cathode or cathode circuit constitutes an output. When the grid is UP, the cathode will go UP and when the grid is DOWN, the cathode will go DOWN. A cathode follower is used wherever the output of some previous circuit, such as an AND or OR circuit, would be overloaded by the following circuits. A cathode follower is not always shown since it merely acts to relay or fortify the output of some other circuit and does not alter the operations of the circuit as a whole, but when shown is in the form of a rectangle enclosing the designations CF and having a single input and a single output terminal.

An important one of the circuit components used herein is the Havens delay circuit, shown as a rectangle enclosing the designation DELAY. This circuit performs a two-fold function, that of actually delaying an incoming pulse to a next succeeding time interval and as a pulse shaping means, since regardless of the shape or duration of an incoming pulse which triggers the device the outgoing pulse one time interval thereafter is full and complete and of a standard shape.

A latch is a circuit component used to hold or maintain a pulse or a signal. The circuit is simple and contains essentially only an AND circuit and a DELAY circuit, the output of each being connected to the input of the other. When the control circuit of the AND circuit is UP and a signal is introduced into this circuit, the signal will continuously circulate therein until the control circuit is brought DOWN. The DELAY circuit acts to constantly regenerate the signal which it transmits from its output through the enabled AND circuit to its own input. Such a latch will effectively register a bit until a control input to the AND circuit is brought DOWN.

A latch may be of several types in accordance with circuit requirements. In one type the output may be connected effectively to the input so that as the input goes UP, the output also goes UP, while in another type the output may be effectively connected to the output of the delay whereby the output of the latch is delayed one microsecond beyond the input thereof.

An inverter is a device, shown as a rectangle about the label INV, which maintains a reversed condition between its input and its output. Normally, while the input is DOWN, the output is UP, and when the input has been driven UP, the output goes DOWN.

A comparison circuit is one constructed and arranged from certain of the above noted fundamental circuits and is used to compare a pair of input circuits, an output being produced only when there is a mismatch of signals on the said two inputs.

A blank detection circuit is one connected to a conductor carrying the successive bits of a number. Any single bit by which a number is characterized will operate a latch and store a signal which will prevent an output signal but where, if the number is blank or zero, there is not transmitted a single bit, then the said latch is not triggered and hence when the indication that the number has been completely transmitted comes, an output signal is established.

A Greater Magnitude Detection circuit is one having two inputs over each of which the bits of a number are concurrently transmitted. If the numbers are exactly alike then each bit of one number will be matched by a corresponding bit of the other and no output will be produced. In the system of the present invention it is not contemplated that there will ever be two numbers exactly alike but that there will always be inequality. The GMD circuit therefore functions to indicate which input carries the greater number. If the device is provided with two outputs corresponding to the two inputs, one of these outputs will go UP indicating that its corresponding input is greater than the other input. It is not necessary to use two outputs, as a signal on one will indicate that a given input is greater than the other whereas the absence of a signal will indicate the opposite condition.

Another component of particular use in the present network is a device called a transfer selection matrix. Where, by way of example, there are three circuits carrying a continuous synchronized succession of words each headed by a usage number, there will be three GMD circuits for determining the relative magnitudes of the three usage numbers and the three outputs of these circuits will enter and control this transfer selection matrix to control the routing of the three numbers and thus to effect a sorting operation. If, as hereinbefore set forth, the usage number in the longest line is greater than the usage number in the intermediate length line and that number is greater than the usage number in the shortest length line, no sorting will be found necessary and the routing will be straightforward. The number in the longest line will be returned to the longest line, the number in the intermediate length line will be returned to the intermediate length line, and the number in the shortest line will be returned to the shortest line. If, on the other hand, it appears that the usage number in the shortest line is greater than the usage number in the intermediate length line, the inputs to these two lines will be transposed so that the numbers are effectively sorted. This device is therefore a means controlled by the indications of differing comparative magnitudes of the usage numbers for rerouting the numbers in storage.

It will be obvious that since the lines are of different lengths, that is they store different numbers of words, the same words will not be periodically compared and that hence in time as a result of the sorting operations, all the usage numbers in the longest line will be greater than any usage number in the intermediate length line and all the usage numbers in the intermediate length line will be greater than any number in the shortest length line.

The words and the numbers are expressed in what is known as the binary-decimal system, that is each word is actually a succession of decimal digits but each digit is expressed by a combination of four bits, an 8 bit, a 4 bit, a 2 bit and a 1 bit, and the value of the decimal digit is the sum of the bit values. Thus a digit expressed by the code 0111 would be 7 or the sum of 4, 2 and 1. A usage number, in the example herein described, is a two digit decimal number so that the usage number 01100011 would be 63.

As mentioned hereinbefore, the usage number 01101001 (69) would appear to be greater than the usage number 01101000 (68) because as these two numbers are compared in a GMD circuit the first (01101001) would be the first to show a bit (the last one to the right) unmatched by a bit of the other. It is to be noted that these numbers emerge from storage bit by bit so that they are effectively read from left to right.

The transfer selection matrix is a device which will respond to a combination of indications from the various GMD circuits employed. Herein, by way of example, three incoming leads are employed and nine outgoing leads are affected in different combinations of three whereby with three words emerging from the three delay lines, three words may be simultaneously entered into these three delay lines. Any desired pattern may be provided, the spirit of the invention including numerous alternative arrangements in which an input terminal controlled by each combination of words emerging from the various delay lines controls the routing of each said emerging word to the same or another one of the storage delay lines.

The following table provides a specific example which is incorporated in the presently described circuitry. Remembering that three delay lines A, B and C are shown, then the three inputs of the transfer selection matrix give the indications, A is greater than B, B is greater than C, and C is greater than A. These three inputs, UP in various combinations, control the routing over nine output leads and affect the following transfers

| Inputs | | | Outputs | | | | | | | | | Transfer line | | |
|---|---|---|---|---|---|---|---|---|---|---|---|---|---|---|
| $B>C$ | $A>B$ | $C>A$ | $a_0$ | $a_1$ | $a_2$ | $b_0$ | $b_1$ | $b_2$ | $c_0$ | $c_1$ | $c_2$ | A | B | C |
| | | | | | | | | | | | | to— | | |
| ------ | ------- | 1 | 1 | ---- | ---- | 1 | ---- | ---- | 1 | ---- | ---- | A | B | C |
| -------- | 1 | ------- | ---- | 1 | ---- | ---- | 1 | ---- | ---- | 1 | ---- | C | A | B |
| -------- | 1 | 1 | ---- | ---- | 1 | ---- | 1 | ---- | 1 | ---- | ---- | B | A | C |
| 1 | ------- | ------- | ---- | ---- | 1 | ---- | ---- | 1 | ---- | ---- | 1 | B | C | A |
| 1 | ------- | 1 | 1 | ---- | ---- | ---- | ---- | 1 | ---- | 1 | ---- | A | C | B |
| 1 | 1 | ------- | ---- | 1 | ---- | 1 | ---- | ---- | ---- | ---- | 1 | C | B | A |

Figure 1:
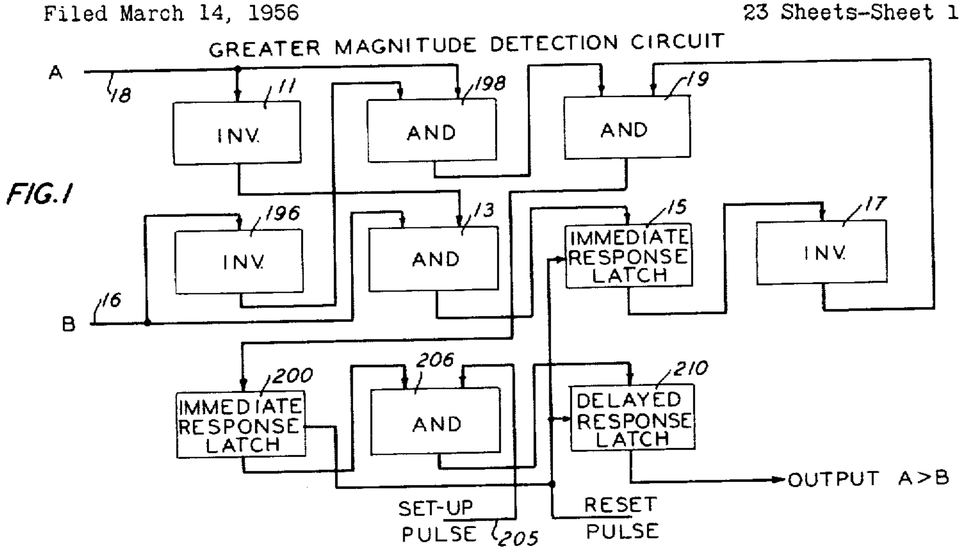
FIG. 1 is a logical circuit diagram of a Greater Magnitude Detection circuit used to give an indication that $A>B$.
Figure 2:
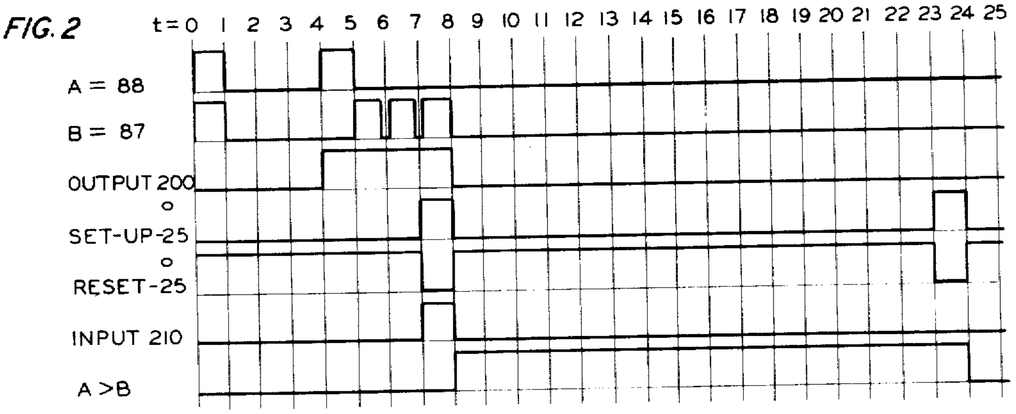
FIG. 2 is a timing chart to show how a Greater Magnitude Detection circuit determines that the usage number $A=88$ is greater than the usage number $B=87$.

In the drawings, FIG. 1 shows a logical circuit diagram of a Greater Magnitude Detection circuit. Two inputs are shown, the line 18 from the A line and the line 16 from the B line. If in the operation of the circuit it appears that A is greater than B, then the output terminal 61 will go UP. The operation of this circuit may be studied by the help of the timing chart, FIG. 2 wherein the usage number 88 is shown as entering the circuit over the A line and the usage number 87 is shown as entering the circuit over the B line. During the time interval between $t=0$ and $t=1$ both terminals 18 and 16 will be UP. Since the A terminal 18 is UP, the output of INV 11 will be DOWN. Hence even though one input terminal of AND 13 is UP, the other is DOWN and there will be no output to trigger the immediate response latch 15. Likewise since the B terminal 16 is UP, the output of INV 196 will be DOWN and hence even though one input terminal of AND 198 is UP, the other is DOWN and there will be no output to operate the AND circuit 19. Thus it will be seen that when a signal on one incoming wire is matched by a signal on the other, no result will be created and the circuit will not advance in operation.

Now it will be seen that in the time interval between $t=4$ and $t=5$ there will be a signal on the incoming wire 18 but none on the incoming wire 16. Hence the inverter 196 being normal will afford a signal coincident with the incoming signal on the A wire 18 and AND circuit 198 will respond. Since the inverter 17 is normal, coincidence will be established in AND circuit 19 and the immediate response latch 200 will be triggered and will bring one terminal of AND circuit 206 UP and will maintain this condition until it is restored at time $t=8$. At time $t=7$ coincidence will be established in AND circuit 206 by the set-up pulse and the output of latch 200 so that the delayed response latch 210 will be triggered and will produce the $A>B$ signal at its output from $t=8$ to $t=24$. At time $t=23$ the reset pulse will release the latch 210 if the immediate response latch 200 has not been triggered again.

Figure 3:
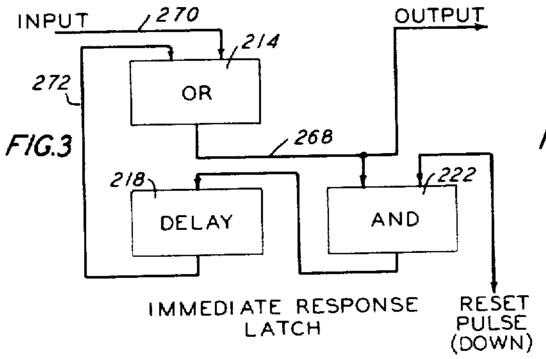
FIG. 3 is a logical circuit diagram of an immediate response latch, used as a component in the Greater Magnitude Detection circuit.

FIG. 3 shows the essential elements of an immediate response latch. A pulse on its input will produce an UP condition on the output of OR circuit 214 which also constitutes the output of the latch. This output UP condition will produce coincidence in the AND circuit 222 since the other input thereof is normally UP (except at times $t=7$, $t=23$, etc.). Therefore the DELAY 218 is triggered and will deliver a pulse to the OR circuit 214 one time interval after the first operation thereof so that as long as the other input of AND circuit 222 remains UP the latch will remain active and will produce an output. When a reset signal is received AND circuit 222 will release and in the following time interval the output of the latch will go DOWN.

Figure 4:
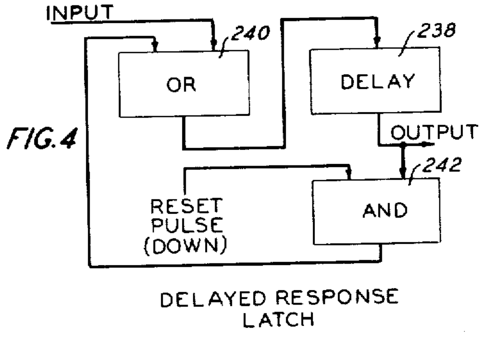
FIG. 4 is a logical circuit diagram of a delayed response latch also used as a component in the Greater Magnitude Detection circuit.

The delayed response latch shown in FIG. 4 is arranged somewhat differently. Here an incoming pulse brings the output of OR circuit 240 UP and this triggers the DELAY circuit 238 so that the UP condition on the output of the latch is not established for a whole time interval after the UP condition on the output of the OR circuit 240. Here again the AND circuit 242 relays the latch circuit output pulse since its other or control input is normally UP. At a time $t=23$, etc. the AND circuit 242 is released and the latch is deenergized, the output thereof going DOWN in the following time interval $t=24$, etc.

Figure 5:
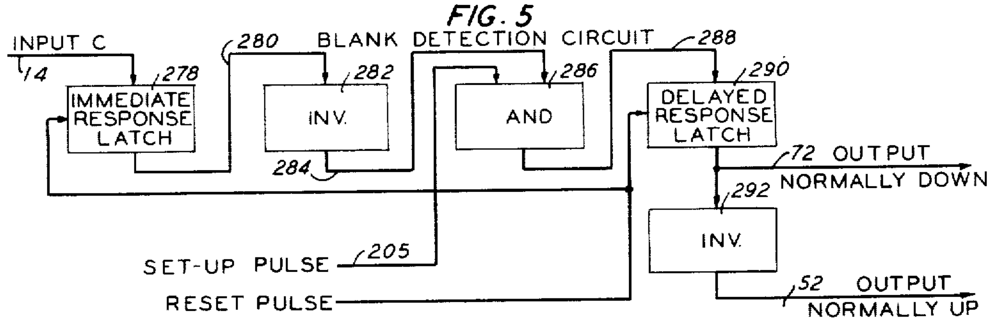
FIG. 5 is a logical circuit diagram of a Blank Detection circuit used in conjunction with the Greater Magnitude Detection circuits to produce an indication that a blank or specifically 00 is greater than any other two digit number.

FIG. 5 shows a Blank Detection circuit. This has an input to an immediate response latch 278 so that if within the interval marked out by the sorting cycle gate but a single bit is transmitted this latch 278 will be triggered into operation and will operate the INV 282 so that its output will go DOWN whereby coincidence will be denied to AND circuit 286 at the following set up pulse time. Hence the upper output of the Blank Detection circuit will remain in its normal DOWN condition and its lower output, the output of the INV 292 will remain in its normal UP state. If during a sorting cycle time no input is received by the latch 278 then at the termination of this period coincidence will be established in AND circuit 286 as a consequence of which the delayed output latch 290 will be triggered and the condition of the two outputs of this circuit will be reversed.

Figure 6:
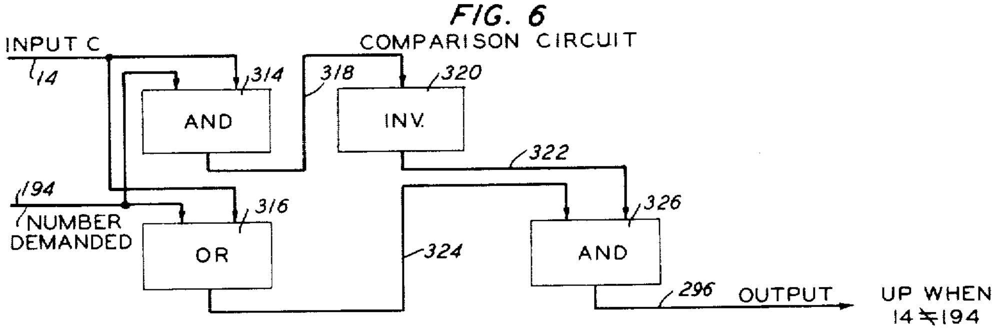
FIG. 6 is a logical circuit diagram of a comparison circuit for producing an output when the incoming signals on two inputs are anything other than exactly alike, this circuit being used as a component of the read out comparison circuit.

A comparison circuit is shown in FIG. 6. This is essentially the principal part of a circuit known elsewhere as an inequality detector. It is a circuit used to compare the pulses simultaneously transmitted over two inputs. So long as the inputs are equal there will be no output but as soon as there is inequality an output will be produced. It will be noted that both inputs enter the AND circuit 314 and also the OR circuit 316. An UP condition on either or both of these inputs will produce an UP condition on the output of OR circuit 316 to thus afford an UP condition on one input of AND circuit 326. The other input of AND circuit 326 comes from the normally UP of inverter 320. If but a single input of the comparison circuit is UP then coincidence is denied to AND circuit 314 and the INV 320 is not affected so that coincidence is produced in AND circuit 326 and the output of the comparison circuit is UP. If both the inputs to the comparison circuit are UP, then coincidence is produced in AND circuit 314, the output of INV is brought DOWN, coincidence is denied to AND circuit 326, and the output of the comparison circuit remains DOWN.

The Comparison Circuit, FIG. 6, is the principal component of the Read-out Comparison Circuit, such as the elements 32, 33 and 35, of the complete logical circuit diagram shown and described hereinafter. When a particular word is wanted for read out from storage, its usage number is offered to all the delay lines, that is, such demanded number is transmitted to one input terminal of each of the read-out comparison circuits. Since in each sorting cycle the usage number of each word emerging from storage is transmitted to one of these read out comparison circuits, a complete comparison may be effected in one of them, whereupon that word is then read out.

If, during a sorting cycle, the comparison circuit 294 detects a single inequality, then a pulse will be transmitted to the latch 298, actually the input of a blank detection circuit so that the output of latch 310 will be maintained in its normally DOWN condition and the output of INV 312 will remain in its normally UP condition. If a complete sorting cycle elapses and latch 298 is not triggered, then the normal UP condition of the output of INV 320 cooperates with the set up pulse to establish coincidence in AND circuit 306 to thus trigger the latch 310 and cause a reversal of the normal conditions of the two outputs of this Read-out Comparison circuit.

Figure 8:
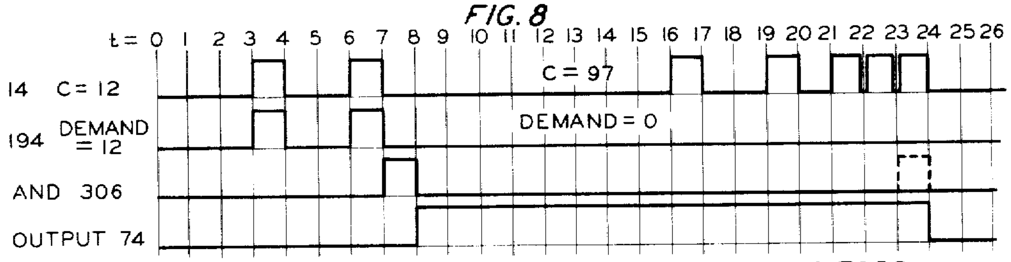
FIG. 8 is a fragmentary time chart showing how a signal that a demanded usage number that has been found is developed.

FIG. 8 is a fragmentary time chart depicting the operation of such a Read-out Comparison circuit, 1st in responding to a demand for a read out of a word having the usage number 12 and 2nd in responding to the absence of any demand.

Figure 9:
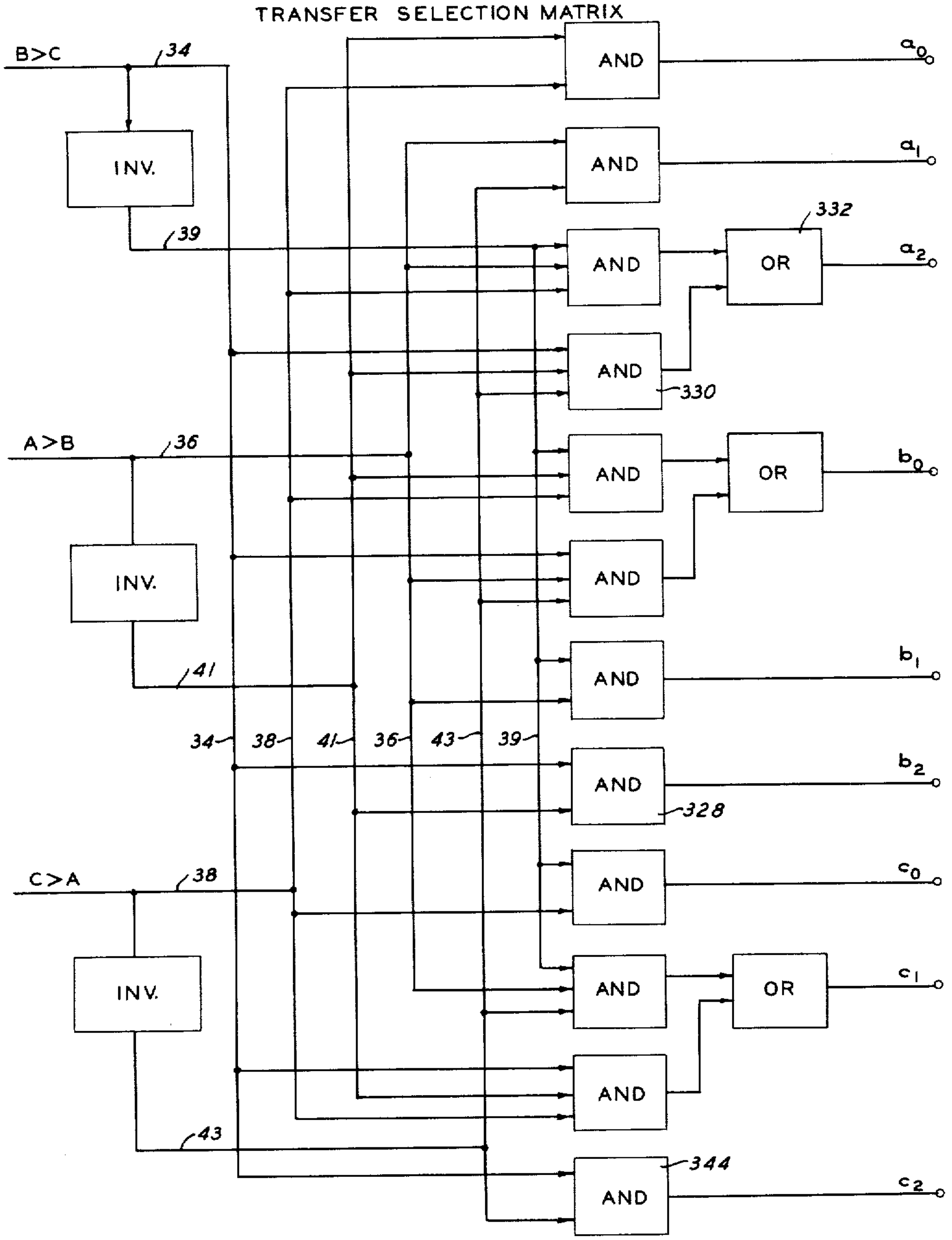
FIG. 9 is a logical circuit diagram of a transfer selection matrix, one of the components used in the circuitry of the device of the present invention.

FIG. 9 shows the essential connections in the logical circuit of the transfer selection matrix. This is a circuit having three inputs from the three Greater Magnitude Detection circuits, *B>C, A>B* and *C>A*. There are three groups of three outputs and the matrix is so arranged that for various combinations of the inputs one output of each of the said three groups will be brought UP. Through the output UP conditions established, the output of each storage line will be routed to the input of some one or another of said lines.

As a specific example, let it be assumed that the usage number coming from line C is 32, the usage number coming from line B is 34, and the usage number coming from line A is 33. The GMD circuits will then determine that B is greater than C, whereupon conductors 34, 41 and 43 will go UP and conductors 36, 38 and 39 will go DOWN. The UP condition on conductors 34, 41 and 43 will establish coincidence in AND circuit 330 which will pass an UP condition through OR circuit 332 to terminal $a_2$ and this, as will be seen hereinafter, will connect the output of line A to the input of line B. Similarly the UP conditions on conductors 34 and 41 will establish coincidence in AND circuit 328 leading to terminal $b_2$ whereby the output of line B will be effectively connected to the input of line C. Lastly the UP condition on conductors 34 and 43 will establish coincidence in AND circuit 344 leading to terminal $c_2$ whereby the output of line C will be effectively connected to the input of line B. Thus when the GMD circuits determine that *B>C* the emerging words will be sorted C to A, B to C and A to B.

Now let these component circuits be combined to form a logical circuit diagram constituting a flow chart of a system sufficient to set forth the principles of the present invention. FIG. 10, on the same sheet with FIG. 15, is a block diagram showing how FIGURES 11 to 16 inclusive may be placed to form such a flow chart.

It will be seen from this composite logical circuit diagram that three delay lines, C, the longest, B, the intermediate length, and A the shortest, are provided. The input to the C line 152 is through the AND circuit 158, the OR circuit 156, and the modulator 154. New words offered for storage are held ready on the upper input of AND circuit 158 and are admitted whenever the OR circuit 178 is operative to bring its output 176 UP. As will be brought out hereinafter, the OR circuit 178 will become operative when any one of the read-out comparison circuits 35, 33, or 32 is operative, or when any one of the Blank Detector circuits 26, 28, or 30 is operative. The OR circuit 156 is also operative during a sorting operation as when the $b_2$ AND circuit 110 is operative to connect the output of the B line to the input of the C line through the uppermost input of the OR circuit 156. At this stage, the pulses representing the word being read out of line B will operate the modulator 152 and start the transmission of such word over the C delay line 152 which, on emerging therefrom, will be amplified and reshaped by the device 2 and then transmitted over the line 182 to the circuits of FIG. 12.

For purposes of illustration the delay line is of sufficient length to hold three and a half words where each exemplified word is 16 time intervals long providing for two decimal digits for the usage number and two decimal digits for data. It will be realized, of course, that these are too short for any practical purpose but are sufficiently long for purposes of explanation. The actual path of the word is then through the 8 pulse time delay 122, adding a one half word length to make the C line a full four word length and then through the AND circuit 118 if the word is to be read out. If the word is merely to be recirculated back to the input of the C line, the OR circuit 156, it proceeds from the delay 122 through the AND circuit 120 and thence through the AND circuit 138, rendered operative by the recirculating gate 142. It may be noted that the AND circuits 118 and 120 are directly controlled by the read out comparison gate 35, the AND circuit 118 being normally inactive and the AND circuit 120 being normally active. These conditions are reversed when the read out comparison gate 35 has successfully responded to a demand in the form of a number transmitted over its input 194. Likewise the AND circuit 136 and the AND circuit 138 are alternatively rendered active, the first when the sorting cycle gate 140 is operative and the second when the recirculating gate 142 is alternatively rendered operative. When the sorting cycle gate 140 is operative, then the word is transmitted by either the AND circuit 100 to the input of the C line, the AND circuit 102 to the input of the A line, or the AND circuit 104 to the input of the B line.

The arrangements to route the word emerging from the eight pulse time delay must be made at least in the last pulse time previous to this event and since this may take all of eight pulse periods the word or at least the usage number is passed through the AND circuit 8 for eight pulse times while it is also traveling through the delay 122. The AND circuit 8 is rendered active for eight pulse times by the usage number gate 180 so that in a manner of speaking various circuits such as the Blank Detector 26, the Greater Magnitude Detection circuit *B>C* 20, and the GMD *C>A* circuit 24 may have a preview of what will be emerging from the delay line 122. The GMD circuit 20 will activate the OR circuit 40 and through that will provide coincidence at the AND circuit providing both the Blank Detector C 26 and the Read out comparison C circuit 35 are normal and their lower outputs are both UP. It may be noted that if the Blank Detection circuit 26 is active that it disables the output of AND circuit 50 and attempts to activate the AND circuit 70 instead. If the Read out comparison circuit 35 is active it disables the output of AND circuit 50 and by operating OR circuit 68 attempts to activate the output of AND circuit 70.

In like manner the Blank Detector B 28 and the B read out comparison circuit 33 both normally control the output of the AND circuit 58 for *A>B* and on operation attempt to activate the output of AND circuit 50 for *B>C*.

Again, in like manner, the A Blank Detector 30 and the A Read out comparison circuit 30 both normally control the output of AND circuit 70 for *C>A* and attempt to activate the output of AND circuit 58 for *A>B*.

Under the circumstances detailed above the three inputs 34 for *B>C*, 36 for *A>B* and 38 for *C>A* are then brought UP in different patterns whereby the Transfer Selection Matrix 80 is operated to activate one out of the three AND circuits 100, 102 and 104, one out of the three AND circuits 106, 108 and 110, and one out of the three AND circuits 112, 114 and 116 for routing the words into storage.

In a simple sorting cycle where no blanks are found the routing of the three words is controlled by the transfer selection matrix 80 and this in turn is controlled by the three GMD circuits *B>C, A>B* and *C>A*. One or more outputs of these circuits simultaneously UP will route the words as follows.

*Table 2*

| Combination | $B>C$ | $A>B$ | $C>A$ | Routes words from— A | B | C |
|---|---|---|---|---|---|---|
| | | | | to— | | |
| 1 | | | 1 | A | B | C |
| 2 | | 1 | | C | A | B |
| 3 | | 1 | 1 | B | A | C |
| 4 | 1 | | | B | C | A |
| 5 | 1 | | 1 | A | C | B |
| 6 | 1 | 1 | | C | B | A |

It is to be noted that the other two theoretically possible combinations all UP or all DOWN may be disregarded as impossible from a practical standpoint. The first of these, all UP, cannot occur since all numbers are different and such a situation would be contradictory. The second of these, all DOWN, is equally contradictory as the result of the comparison of the usage numbers after the device has been put into operation and a given number of words have been put into storage. At the start of operations when all blanks are sensed there will be no information to route into any one of the storage lines and hence at that particular time the result will be all DOWN and hence there will be no output from the transfer selection matrix. After the operations have begun and a single number is found, then and thereafter this combination of all DOWN will not occur.

The transfer selection matrix is also controlled by the Blank Detectors, for each of these has two outputs one normally DOWN and the other normally UP. The normally UP outputs enable certain AND circuits beyond the GMD circuits so as to provide normal responses to the transfer selection matrix in accordance with the above table. When, however, a Blank Detector operates, it changes this normal response since any blank found must be shifted to the longest storage line to provide space into which a new word may be entered into storage. As an example, let us suppose that $C=24$, $B=0$ and $A=16$. The normal response of the GMD circuits would be such that outputs would be derived from $A>B$ and $C>A$ under which condition the word in the A line would be reentered in the B line, the word in the B line would be reentered in the A line and the word in the C line would be reentered in the C line (see combination 3 above). However, the B line Blank Detector will be operated, thus disabling the $A>B$ lead entering the transfer selection matrix and enabling the $B>C$ lead, thus effectively setting up combination 5 instead of combination 3. Therefore the word in line A will be reentered in line A, the blank in line B will be entered into line C and the word in line C will be entered into line B. The complete routing where blanks are detected is set forth in the following table.

*Table 3*

| | $B>C$ | $A>B$ | $C>A$ | Words routed from— A | B | C |
|---|---|---|---|---|---|---|
| | | | | to— | | |
| C and A are blank | | 1 | | C | A | B |
| C and B are blank | | | 1 | A | B | C |
| A and B are blank | 1 | | | B | C | A |
| C is blank and $A>B$ | | 1 | 1 | B | A | C |
| C is blank and $B>A$ | | | 1 | A | B | C |
| B is blank and $C>A$ | 1 | | 1 | A | C | B |
| B is blank and $A>C$ | 1 | | | B | C | A |
| A is blank and $C>B$ | | 1 | | C | A | B |
| A is blank and $B>A$ | 1 | 1 | | C | B | A |

In a like manner, when a number in storage is demanded and when its usage number is found it is read out, the pattern of leads into the transfer selection matrix may be changed. As the number found is being read out, the output of the line in which it was found is switched to the input of the C line whereby a blank may be entered in the C line. If the wanted word is in the C line, then the read out comparison circuit C is operated, whereupon the $C>A$ lead is enabled and the $B>C$ lead is disabled, as shown in the following tables.

*Table 4*

| Changing Combination | $B>C$ | $A>B$ | $C>A$ | Word read out of C Route from— A | B | C |
|---|---|---|---|---|---|---|
| | | | | to— | | |
| 1 to | | | 1 | A | B | C |
| 2 to | | 1 | 1 | B | A | C |
| 3 to | | 1 | 1 | B | A | C |
| 4 to | | | 1 | A | B | C |
| 5 to | | | 1 | A | B | C |
| 6 to | | 1 | 1 | B | A | C |

*Table 5*

| Combination Changed from | $B>C$ | $A>B$ | $C>A$ | Word read out of B Route from— A | B | C |
|---|---|---|---|---|---|---|
| | | | | to— | | |
| 1 to | 1 | | 1 | A | C | B |
| 2 to | 1 | | | B | C | A |
| 3 to | 1 | | 1 | A | C | B |
| 4 to | 1 | | | B | C | A |
| 5 to | 1 | | 1 | A | C | B |
| 6 to | 1 | | | B | C | A |

*Table 6*

| Combination Changed from | $B>C$ | $A>B$ | $C>A$ | Word read out of A Route from— A | B | C |
|---|---|---|---|---|---|---|
| | | | | to— | | |
| 1 to | | 1 | | C | A | B |
| 2 to | | 1 | | C | A | B |
| 3 to | | 1 | | C | A | B |
| 4 to | 1 | 1 | | C | B | A |
| 5 to | 1 | 1 | | C | B | A |
| 6 to | 1 | 1 | | C | B | A |

With these considerations of the flow of information it is now proper to further illustrate the operation of the devices of the present invention by means of an example of the sorting which will take place automatically. This is shown in FIG. 17 which is a sequence chart in which it is postulated that at the time $t=0$ there are four words stored in the C line having the usage numbers 94, 68, 67 and 23, that there are three words in the B line having the usage numbers 40, 12 and 00 and that there are two words in the A line having the usage numbers 41 and 93. As the three numbers 94 (for C) 40 (for B) and 41 (for A) move into the Greater Magnitude circuits it is determined that $A>B$ and $C>A$ whereupon C is routed to C, B is routed to A, and A is routed to B. The 94 in line C will be entered in the C line after the last word (23) therein and will appear again in the 5th sorting cycle. The 40 in the line B will be entered after the last word in the A line and will reappear for sorting in the third sorting cycle. The 41 in the A line will be entered after the last word 00 in the B line and will reappear for sorting in the fourth sorting cycle.

In the second sorting cycle it will be noted that the word whose usage number is 12 is demanded. Under normal circumstances the numbers 68 (C), 12 (B) and 93 (A) would produce the result $A>B$ but since the B line contains the wanted word so that the B Read out Comparison circuit will become active, the $A>B$ output will be disabled and the $B>C$ output will be enabled instead. Therefore the 68 in line C will be entered after the last number 40 now in the A line and will reappear for sorting next in the fourth sorting cycle. The 12 in the B line is read out and the blank 00 left by this operation is entered after the last number 94 in the C line and will appear for sorting in the sixth sorting cycle and finally the 93 in the A line will be entered after the last word 41 now in the B line and will reappear for sorting in the fifth sorting cycle.

It may be noted that a word having the usage number 61 is offered for storage in the third sorting cycle and since a blank appears in that cycle in the B line this new number is accepted and is placed in the C line after the last number 00 entered therein.

In the sixth sorting cycle a word having the usage number 13 is offered for storage and since a blank appears in the C line in that sorting cycle, it is accepted.

Then in the eighth sorting cycle this same number is demanded for read out but cannot be found. Nor can it be found in the ninth cycle so it is held and another demand is made in the tenth cycle. This time it is found and will be read out. However, a new number 75 is offered simultaneously for storage so that this new number 75 is accepted and is read in to the C line to replace the number 13 being read out. The number 75 will appear for sorting in the fourteenth cycle.

It may be noted that it takes little time to produce a complete sorting so that after eleven cycles, equilibrium is attained and at this time the programmer may transfer the UP condition from the sorting cycle gate to the recirculation gate or this may be done automatically.

FIG. 18 is a block diagram showing how FIGS. 19 to 23 inclusive may be placed to form a time chart showing five sorting cycles and the disposal of the words controlled by the first of four of such cycles, these being the same as those depicted in the sequence chart FIG. 17.

In FIG. 19 the output of line C is shown to be 94, the output of line B is 40 and the output of line A is 41. Simple arithmetic will show that with these values $A>B$ and $C>A$. During the first sorting cycle the three Greater Magnitude Detectors will respond to the output of the three storage lines and at some point in the cycle (the first eight pulse times) the first or immediate response latches therein will be triggered so that at time $t=7$ when the set up pulse is transmitted, the second or delayed response latch will operate. Thereupon, at time $b=8$, as shown in FIG. 20, the GMD circuits $A>B$ and $C>A$ will be operated. The words in line C, line B and line A (in each case the Data is represented by the eight time intervals following the usage number) will consist of four digits or sixteen time pulse intervals and such words will be issued from the 8 time pulse delay circuits during intervals $t=8$ to $t=24$ as depicted in FIG. 20. Thus the preview of the usage numbers is had during the first eight time intervals of FIG. 19 and the complete words are passed through the sorting network during the next sixteen time intervals as shown in FIG. 20. Therefore the $A>B$ and the $C>A$ Greater Magnitude Detectors properly operate the sorting circuits during the ninth to sixteenth intervals inclusive whereby the word from line C is sorted to line C, the word from line B is sorted to line A and the word in line A is sorted to line B.

In like manner, the second sorting cycle encompasses the seventeenth ($t=16$ to $t=17$) to the twenty-fourth intervals and the results thereof are shown in the next FIG. 21, where B>C and C>A are shown to be operated during the following 16 (25th to 40th) intervals.

It is to be noted that since the usage number 12, representing a demand for that number is made during the second sorting cycle and that since that particular number is found to exist in the B line, that the Read out Comparison circuit B will also be operated during the time these words are sorted, that is, as shown in FIG. 21. The number in line B is therefore read out and the blank left thereby is sorted into line C.

FIG. 21 shows a number 61 being offered for storage in the third sorting cycle and since a blank is found in B the normal combination A>B and C>A is changed to B>C and C>A so that the words are sorted A to A, B to C and C to B, as shown in FIG. 22.

In the fourth sorting cycle again there is nothing to change the sorting pattern established by the apparent A>B and B>C so that the sorting becomes A to C, B to B and C to A, as shown in FIG. 23.

Further graphs might be shown to cover all the operations depicted in FIG. 17 but it is believed that these five figures 19 to 23 inclusive will be sufficient to give a clear explanation of the electronic switching of the present self-sorting arrangement.

FIGS. 25 to 32 inclusive, arranged as indicated in FIG. 24, is a schematic circuit diagram for the circuitry associated with one of the delay lines, line C. Similar circuitry is used for the other delay lines and the units that are shared with the other delay lines is indicated herein. In order to understand the source from which these signals come, it will be helpful first to consider the nature of the storage medium, as well as the method of entering, extracting, amplifying and reshaping information from the delay line.

In this system, the delay lines are assumed to be of the supersonic acoustical delay line type using mercury as transmission medium. The electrical input to the delay lines is converted by means of piezo-electric crystals, usually made of quartz or other suitable material, to sonic waves which are passed down the delay line. At the receiving end of the delay line the sonic waves are reconverted into electrical information also by means of piezo-electric crystals working in the inverse manner to that in which the sonic information was generated. The delay is obtained by virtue of the much slower velocity of propagation of sonic waves in a liquid, especially in mercury, as compared with the speed of propagation of electrical energy in free space over wires. Mercury and quartz also compare favorably insofar as equivalent impedances match, namely, their so-called acoustical impedances are approximately equal in value. This matching of the sending and receiving crystals to the transmitting medium, insofar as impedance levels, provides maximum band width, hence, minimum signal distortion as can be understood from the electrical analogy. There is less transmission loss as well as greater ease of obtaining the necessary band width in the associated amplifiers if the input pulse information to the delay lines is superimposed upon a suitable high frequency carrier. A carrier frequency of about ten megacycles for one microsecond pulse is sufficiently high so that the pulse information can later be easily separated from the carrier frequency without any appreciable loss of signal wave shape. This carrier cannot be made too high since the inherent attenuations in the mercury itself increase with the frequency of the sonic pulses that are being transmitted.

The conversion from a chain of one microsecond pulses to a chain of pulse-modulated ten megacycles waves is accomplished for line C by Modulator 154. This delay line modulator is of the form of a "Ringing Oscillator," Pat. No. 2,562,550 of B. L. Havens and can be fully understood by reference to that patent description. A brief explanation of the mode of operation is included to aid in the understanding of the system storage. A tuned circuit is caused to oscillate in response to the pulse inputs and is made up of inductance L1 and the input and stray capacitances of the delay line. When a pulse is not present on the input lead 228 to the modulator, a D.C. current circulates through resistance R1, diode D1 in the forward direction and L1 by virtue of the difference in value between the potentials to which R1 and L1 are returned, namely, in this case, we have (230—220 volts=10) drop across the R1, D1 and L1. When the vacuum tube V1 is made conductive, the plate of V1, potential 232, drops and the energy in L1 present, due to the current that was flowing in L1, is now converted to capacitative storage energy as diode D1 now prevents current from flowing back through D1. By its oscillation of energy between L1 and the associated capacitance a ringing pulse of frequency equal to the tuning frequency of LC combination is produced. R1 is equal to the resistance needed to critically damp this ringing when D1 conducts at the end of the input pulse interval. In order to narrow the width of the ringing output pulse, the input pulse is coincidenced with a Synchronizing Pulse 230 which is narrower in width than the individual input pulses and about ⅓ to ½ in time length. The trailing edge of each synchronizing pulse, spaced one microsecond apart, coincides with the trailing edge of each input pulse. This "ringing oscillator" output 234 is then fed to the input of delay line C through which it is transmitted and delayed before reappearing at the output 236 of the delay line.

The delayed output 236 is then amplified and reshaped in the Amplifier and Reshaper Circuit, FIG. 26. Vacuum tubes V2, V3, V4, V5 and V6, in conjunction with the associated circuitry are so-called intermediate frequencies or IF amplifiers for the purpose of restoring the attenuated output from the delay line to its original value. Each stage of this 5 stage amplifier is tuned to the carrier frequency of 10 megacycles employed in the delay line, by means of the variable inductances L2, L3, L4, L5, L6 and L7. These inductances resonate at 10 megacycles with the stray and tube capacitances present and are effectively shunted by low resistance value resistors R2, R3, R4, R5, R6, and R7, low in value (in this case, 1000 ohms) to increase the circuit band width to the width needed. The amount of amplifier gain that must be provided depends on the delay line attenuation and will vary in accordance with the length of the line and the efficiency of the conversions between electrical and sonic signal representation. As an order of magnitude for a 256 microseconds length delay line (4 sixteen digit words) in which 256 pulses spaced one microsecond apart can be stored, the overall attenuation through the delay line would be approximately 70 decibels. (Voltage attenuation approximately 3000.) We then need for IF amplifier stage a gain of approximately 5 per stage which can be easily realized even at 10 megacycles frequency. The vacuum tubes shown in this embodiment are high gain pentode tubes, type 6AK5. Cathode self-biasing is provided as shown and adequate filtering of the supply voltages is accomplished by the resistor-condenser decoupling combinations shown for each stage. (Stage 1, R–13 and C6.) The output from the final IF amplifier stage is taken from inductor L7 and passed through a rectifying circuit composed of diode D2, condenser C2 and resistor R8 returned to a negative potential. The purposes of this rectifying circuit is to remove the carrier from the signal and leave only the pulses that were superimposed on the carrier. The positive oscillations of voltage 246 across L7 cause diode D2 to conduct in the forward direction and charges condenser C2 to a voltage substantially equal to the peak value of the oscillation of voltage 246. Voltage 248 across condenser C2 will remain substantially at this peak value even though voltage 246 oscillates below this value to its negative maximum amplitude before returning to the next peak. Voltage 248 is of the same shape as the peak amplitudes of the oscillating wave form 246. Resistor R8 serves the purpose of returning voltage 248 from its peak amplitude to its no-signal voltage level, ground potential, after the disappearance of the "ringing" wave form 246. By connecting R8 to a negative potential it is possible to make R8 much larger in value than if it were connected directly to ground. Hence, there is less discharge of condenser C2 between cycles of the input wave form and much better reproduction of the pulse superimposed on the carrier. Voltage 248 is then a positive-going pulse-type waveform without carrier, a replica of the input information that was to be stored in the delay line. It must now be reshaped and put in proper timing with the remainder of the pulses in the system.

Tube V7 amplifies voltage 248 providing a negative pulse 250 which is applied through the condenser C3 to the grid of tube V8. V8 is normally conducting due to the resistor R9 which is connected to a substantially higher potential than the cathode of V8. V8 is fully conducting before a signal is applied, but is cut off when a negative output 250 from V7 is present. The output 252 from tube V8 is then a sharply rising pulse which rises to its maximum value of ground level. The plate return of V8 goes to ground, hence, the plate of V8 cannot rise above ground level. This waveform is applied to tube V9 whose cathode is connected through diode D3 and resistor R10 to a narrow negative-going Clamping Signal, 256, accurately timed to coincide with the trailing edge of the Synchronizing Signal 230. The timing relation between the Synchronizing Signal, the Clamping Signal and typical system pulses is shown in the above noted Borders application, Serial Number 444,251, filed July 19, 1954. The upper level of the clamping signal is at ground potential while the maximum negative excursion is —25 volts. The leading edge of signal 252 is reproduced on the cathode of V9. Since there is no other circuit element connected to this cathode except the diode D3, this cathode will remain at the maximum potential to which the grid is driven because of the charging of the stray capacitance associated with the cathode circuit. Waveform 254 at the cathode of V9 was a leading edge which reproduces the leading edge of 252 and which levels off and remains at that peak value until the Clamping Signal 256 suddenly goes negative to —25 volts causing the cathode of V9 to return to this potential because of the low impedance path between the cathode and —25 volts now provided through the forward resistance of D3 and the low resistance R10. R10 is provided for circuits where the Clamping Signal must energize a number of circuits in order to provide decoupling between the Clamping Signal and the various points being clamped. The reshaped and timed signal 254 is then passed through cathode follower stage V10 providing output 182 across cathode resistor R16. This output signal from line C which is now reshaped and timed is then fed into the various detection circuits.

The information from line C, as previously noted, is fed into an 8 pulse-time delay unit, 122, as well as into AND circuit 8. AND circuit 8 provides an output as a result of the coincidence between the delay line output and the Usage Number Selection Gate 180 as previously noted. The operation of AND circuit 8 will be explained and its mode of operation will apply to all other AND circuits used in this system. The pulses present on line 182 vary in potential from about a minimum of —25 volts to a maximum of zero volts. The usage number selection gate line when energized is at zero volts level and when de-energized is at —25 volts level. When both lines 182 and 180 are at zero volts (ground level), the grid of V11 is no longer restrained at the negative potential by the diodes D4 and D5 as was the case when either input was at —25 volts level. Point 258 rises to ground level due to the resistor R11 which is returned to a high potential (+150 volts, in this case). Point 258 can rise to no higher than the lowest of either input (in this case, since both inputs are at ground level, is equal to ground level). Waveform 258 which indicates coincidence between the two inputs, is passed through cathode follower stage V11 appearing across resistor R12 as output lead 14. Since the Usage Number Selection Gate is energized only during the usage number part of a word, output 14 will be at —25 volts during that portion of a word which corresponded to the data part of the input information.

The output from line C, 182, is also fed into an 8 pulse time delay unit, 122, and arrives at the output lead 188 delayed 8 microsecond time intervals. This 8 pulse time delay units is made up of eight separate one microsecond delay units of the form shown in the pulse delay circuit, Patent Re. 23,699 of B. L. Havens. The output from this delay circuit occurs in the next time interval from the input pulse. The delay is determined by the spacing of the pulses and the repetition frequency of the Synchronizing Signal both of which are equal to one microsecond. The input signal to be delayed is brought into coincidence with the synchronizing signal before being applied to the grid of the input tube, V12 of the first delay unit in the chain. V12 is normally non-conducting except when the synchronizing pulse rises to ground level in coincidence with an input pulse present on input 182. This synchronizing pulse, as noted previously, rises to ground level during the latter ⅓ of each microsecond interval, hence, V12 cannot begin to conduct until that time. If there is an input pulse, V12 remains conducting during the presence of the synchronizing pulse and its grid returns to its negative voltage level at the end of the microsecond interval. Voltage 260 at the plate of V12 begins to rise as the synchronizing signal goes negative in accordance with the sudden reduction in current through V12. As V12 is cut off because of the end of the synchronizing pulse, inductance L8 causes the plate voltage 260 to overshoot the +B value of the stage (150 volts) and oscillate for about ½ of one cycle before being critically damped by resistor R13 in parallel with L8. This plate waveform 260 is transmitted through condenser C4 to diode D6. The plate of D6 is returned to a low impedance bias line of approximately —25 volts. Voltage 262 cannot fall below this bias level of —25 volts because of the low impedance path that would be formed through diode D6. When plate waveform 260 is transferred to the small condenser C4, the negative excursion of the plate waveform does not appear at 262 because of the diode D6 which restrains that point normally at —25 volts from going below that level. Voltage 262 rises in response to the rise in potential that occurred at the plate of V12 when the inductance L8 caused the plate voltage to overshoot the +B return voltage of 150 volts.

Voltage 262 is then a replica of the positive oscillation of 260 above the +B level. This voltage 262 is then passed through diode D7 to condenser C5 which operates in a similar manner to the operation of stage V9 in the reshaper circuit. C5 is charged to the maximum potential of voltage 262 and the voltage 264 remains at that maximum value even though 262 returns to a lower potential because of the non-conductance of the diode D7 when voltage at 264 exceeds voltage at 262. Point 264 then remains at this positive maximum until the Clamping Signal, as previously mentioned, clamping through diode D6 and resistor R14 returns voltage 264 to its lower level. As can be seen, the lower level of 262 is equal to the bias value which is set equal to approximately —25 volts. The upper value of 264 cannot materially exceed the upper limit of the Clamping Signal whose upper value was noted previously as being equal to ground level. Hence, signal 264 varies between —25 volts and zero volts and is present in the time interval beginning after the synchronizing pulse interval which energizes V12.

The output occurs in the next time interval because the positive rise which occurred at the plate of V12 in signal 260 and which in turn gave rise to signal 264, occurred after the end of the Synchronizing Signal which means that it then was in the next time interval. Voltage 264 then is a sharply rising voltage which remains at its maximum value until the end of the microsecond interval and occurs during the time interval following the time interval of initiating input pulse 182. This voltage 264 is passed through cathode follower stage V13 appearing across resistor R15 as the delayed and reshaped output 266 from the first one microsecond delay unit. The other microsecond delay units in the system operate in the same manner.

The Greater Magnitude Detection Circuit 20 (FIG. 29) compares the reshaped output of line C with the reshaped output of line B after these outputs are brought into coincidence with the Usage Selection Gate in their respective AND circuits. The mode of operation of GMD circuit has been explained by the logical diagram of FIG. 1. Inverter 196 is a normal type inverter with a cathode follower output and a resistor-divider network to return the output lead to the same D.C. range of voltage variations as the input lead. The divider network also has a condenser across the cross resistor to improve the high frequency response so as to preserve the pulse waveshape. The OR circuit 214 in the Latch circuit provides an output 268 whenever either input lead 270 or input lead 272 is energized. Output 268 of the OR circuit cannot be lower than either input because of the low forward resistance of the diodes D7 and/or D8 which would be present if voltage 268 were lower than either input. When either input is energized, because of the low forward resistance of the diode attached to that input, the output is energized. The remaining AND, OR and Delay circuits in this Latch can be understood as the operation of these types of units have been previously explained.

The output 274 circuit is energized whenever there is an unmatched pulse present in any microsecond interval in line B prior to an unmatched pulse in line C. The latched output remains energized and provides an output 276 from the AND circuit by coincidence of inputs 274 and set-up pulse 205. Line 276, when energized, causes the delayed response Latch circuit to be energized and its output latched beginning at a time 8-pulse intervals later than the beginning of the words from lines C and B which are being compared.

Referring back to the timing diagram of FIG. 18, we see then that for sorting cycle 1 for the indications of greater amplitude, the appropriate outputs from the various GMD Circuits are energized beginning at $t=8$ and lasting until $t=24$, so as to coincide in time with the delayed outputs from the delay lines which begin to emerge from the 8-pulse time delay units at $t=8$. For sorting cycle 1, lead 71, which indicates that C is greater than A and lead 61, which indicates that A is greater than B, are energized during the period noted. In circuit diagram FIG. 31, for OR circuit 40, inputs 39 and 46 are not energized since B is neither read out nor is equal to zero for sorting cycle 1. Output 34 from AND circuit 50 is energized for sorting cycle 1 in response to inputs 48 (which is energized since B is numerically greater than C) and inputs 52 and 54 (which are energized since the output of delay line C does not equal zero nor is read out during this subcycle).

The manner in which the Blank Detection Circuit provides the proper output pulses can be better understood by reference to the logical diagram shown in FIG. 5 in which the input 14 from line C is fed into an immediate response latch 278. Output 280 of this latch circuit is inverted by INV 282 providing an output 284 which is brought into coincidence with Setup Pulse 205 in AND circuit 286 providing an output 288 which operates a delayed response latch circuit 290 to energize output lead 72. Output lead 52 from this blank detection circuit is obtained by passing output 72 through INV 292. This circuit operates in a manner similar to that of the Greater Magnitude Detection Circuit shown in FIG. 1. Failure to have the input 14 energized during any sorting cycle means that the Latch 278 will not be energized. The output 280 from the Latch is inverted by means of INV 282 and provides the output lead 284 which is energized when there is no usage number in line C. Lead 284 is brought into coincidence with Setup pulse 205 in AND circuit 286 which provides an output 288 to operate the delayed response Latch 290, to provide the required output. The latches operate as explained previously in FIGS. 3 and 4.

Figure 7:
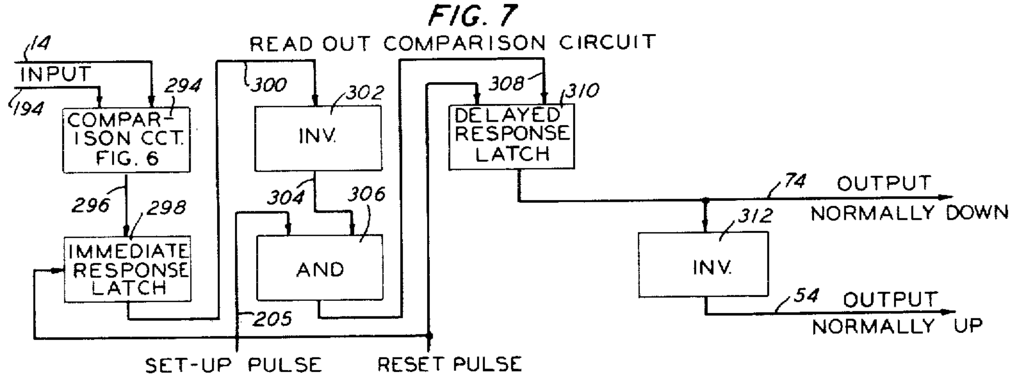
FIG. 7 is a logical circuit diagram of a read out comparison circuit by which a signal is produced when a certain usage numbered word is demanded and it is found.

The Readout Comparison Circuit logical diagram is shown in FIG. 7 in which the input 194 from the Program Number Cycler (by which a demand for a word is made) is to be compared with the input 14 from delay line C. The comparison is accomplished in Comparison circuit 294 which provides an output 296 if the output from C does not equal the number called for by the Program Number Cycler. If C does not equal the number called for, line 296 is energized causing the immediate response latch 298 to be energized which provides the usual output on lead 300. Output 300 is inverted in INV 302 to provide output 304 which is brought into coincidence with the Setup Pulse 205 thus providing an output 308 when both these inputs to AND circuit 306 are energized. Lead 308 energizes the delayed response latch 310 to provide output 74, and output 54 (provided by inverting output 74 by means of INV 312). The operation of this Readout Comparison Circuit is similar to the operation of the GMD Circuit shown in FIG. 1. If lead 296 is energized it indicates that the usage number in line C does not equal the number called for by the program number cycle. Lead 300 from Latch 298, is then energized in response to this inequality whereas, 304 is de-energized when this inequality occurs due to the INV 302. There is no output on lead 308 in response to the Setup Pulse 205, under these conditions, which means that the delayed response latch 310 does not function and the usual type outputs are not provided for this inequality between the usage number from Line C and the number supplied by the Program Number Cycler. It can be seen that when Line C output does equal the number called for, the circuits will operate in a similar manner to the circuits shown in the logical diagram of FIG. 5 for a Blank Detection Circuit. The operation of the Comparison Circuit 294 can be understood by the logical diagram shown in FIG. 6 in which the 2 inputs are fed into AND circuit 314 and OR circuit 316. The output 318 of AND circuit 314, is inverted by INV 320 providing lead 322 which, in conjunction with lead 324 from OR circuit 316, are fed into AND circuit 326 to provide output lead 296. If only 1 of the two inputs is energized, there will be an output on lead 324 from OR circuit 316, whereas, output 318 from AND circuit 314 will be de-energized so that output 322, the inverse of 318, will be energized. Since both inputs to AND circuit 326 are energized, output 296 is energized, as required, if C does not equal the number. If both inputs to the Comparison Circuit are de-energized, lead 324 will be de-energized as can be understood from the operation of OR circuit hence AND circuit output 296 will not be energized. If both inputs to the Comparison Circuit are energized, output 318 from AND circuit 314 will be energized, hence output 322 which is the inverse of 318 will be de-energized and, therefore, the output 296 from AND circuit 326 will, in this case, also be de-energized.

In order to provide the desired switching leads for each delay line, we have to convert the various indications of greater magnitude, namely, the indications of the $B>C$ line 34, the $A>B$ line 36, and the line $C>A$ 38, by means of the Transfer Selection Matrix 80 as shown in FIG. 32. The operation of this matrix can be better understood by reference to the Table 1, in which the various possible input lead conditions and the corresponding output lead conditions are shown. For the three inputs and nine output leads a blank for any particular lead indicates that that lead is de-energized, whereas, a one for any lead indicates that that lead is energized.

The final output switching circuits in the general block diagram are shown in the schematic circuit diagram FIG. 28 embodied by our usual diode type AND circuits AND circuits 100, 102 and 104 for Line C are shown to switch Line C output to the appropriate delay line. OR circuit 156, which energizes the Modulator for Line C, has five inputs which may be energized, namely, inputs 346 and 348 from A and B output switching circuits, respectively, as well as information to be read in via line 172 and two inputs 350 and 352 which indicate that Line C is to be recirculated. The output of Line C will energize line 350 when the Recirculating Gate line 142 is energized. When the Recirculating Gate is energized, it means that we are not sorting and hence, Line C can be recirculated directly through OR circuit 156. Lead 352 is energized when the Transfer Selection Matrix indicates to AND circuit 100 that Line C output is to be recirculated back to Line C.

In order to be able to read in information, AND circuit 158 must pass the information supplied on input lead 174. The other input 176 to AND circuit 178 is energized to allow this input information to be inserted if any line is read out or is blank. This lead 176 is obtained from the multiple-input OR circuit 178, which is a common cathode OR circuit combining the two triple-input OR circuits in the manner previously explained (one triple-input OR indicates a blank present in any line while the other triple-input OR indicates a read out from any line).

It thus appears that through the use of different magnitude identification or usage numbers each permanently associated with each word and assigned thereto by the programmer that such words may be automatically sorted so that the next word demanded (by the programmer) is either immediately available or may be found and appropriated for use in a minimum time interval.

What is claimed is:

1. In an information handling system, means for storing information in the form of words each consisting of a plurality of bits moving through storage in seriatim and each having as a forepart thereof a representation, expressed by said bits, of an identification or usage number constituting a key to the intended order in which said words will be demanded for use, said storage means including a plurality of delay lines into one end of which said words may be put in seriatim and out of the other end of which said words will emerge, said lines being of different lengths to store correspondingly different numbers of words, a greater magnitude detection circuit connected to each permutational pair of said delay lines to determine the relative values of the usage numbers of words simultaneously emerging from said pair of delay lines, an electronic network for selectively routing words emerging from said delay lines into said means for storing information and a transfer selection matrix controlled by said greater magnitude detection circuits for operating said electronic network.

2. In an information handling system, means for storing information in the form of words each consisting of a plurality of bits moving through storage in seriatim and each having as a forepart thereof a representation, expressed by said bits, of an identification or usage number constituting a key to the intended order in which said words will be demanded for use, said storage means including a plurality of delay lines into one end of which said words may be put in seriatim and out of the other end of which said words will emerge, said lines being of different lengths to store correspondingly different numbers of words, a greater magnitude detection circuit connected to each permutational pair of said delay lines to determine the relative values of the usage numbers of words simultaneously emerging from said delay lines, an electronic network interconnecting the said in and out ends of said storage means for selectively routing words emerging from said delay lines and a transfer selection matrix for operating said electronic network, said matrix being constructed and arranged to control the routing of said words in descending order of the values of said usage numbers into correspondingly shorter delay lines, said matrix being controlled by said greater magnitude detection circuits.

3. In an information handling system, means for storing information in the form of words each consisting of a plurality of bits moving through storage in seriatim and each having as a forepart thereof a representation, expressed by said bits, of an identification or usage number constituting a key to the intended order in which said words will be demanded for use, said storage means including a plurality of delay lines into one end of which said words may be put in seriatim and out of the order end of which said words will emerge, said lines being of different lengths to store correspondingly different numbers of words, a greater magnitude detection circuit connected to each permutational pair of said delay lines to determine the relative values of the usage numbers of words simultaneously emerging from said pairs of delay lines, a blank detection circuit connected to each said delay line, an electronic network for selectively routing words emerging from said delay lines back into the same or other delay lines, and a transfer selection matrix jointly controlled by said greater magnitude detection circuits and said blank detection circuits for operating said electronic network.

4. In an information handling system, means for storing information in the form of words each consisting of a plurality of bits moving through storage in seriatim and each having as a forepart thereof a representation, expressed by said bits, of in identification or usage number constituting a key to the intended order in which said words will be demanded for use, said storage means including a plurality of delay lines into one end of which said words may be put in seriatim and out of the other end of which said words will emerge, said lines being of different lengths to store correspondingly different numbers of words, a greater magnitude detection circuit connected to each permutational pair of said delay lines to determine the relative values of the usage numbers of words simultaneously emerging from said lines of said pairs, a blank detection circuit connected to each said delay line, a demand line for reading into said system the usage number of a word demanded for use, a read out comparison circuit for each said delay line having one input connected to its said associated delay line and another input connected to said demand line for detecting identity between an emerging word in one of said delay lines and the said demanded word, an electronic network for selectively interconnecting said delay line inputs, said delay line outputs, demanded word outputs and a new word into storage input and a transfer selection matrix under the joint control of said greater magnitude detection circuits, said blank detection circuits and said read out comparison circuits for operating said electronic network.

5. In an information handling system, means for storing information in the form of words each consisting of a plurality of bits moving through storage in seriatim and each having as a forepart thereof a representation, expressed by said bits, of an identification or usage number constituting a key to the intended order in which said words will be demanded for use, said storage means including a plurality of delay lines into one end of which said words may be put in seriatim and out of the other end of which said words will emerge, said lines being of different lengths to sore correspondingly different numbers of words, means for determining the relative values of the usage numbers of words simultaneously emerging from said storage lines, and means controlled thereby for selectively routing said emerging words to the same or other delay lines, said means for determining said relative values operating effectively prior to the emergence of said words from said lines.

6. In an information handling system, means for storing information in the form of words each consisting of a plurality of bits moving through storage in seriatim and each having as a forepart thereof a representation, expressed by said bits, of an identification or usage number constituting a key to the intended order in which said words will be demanded for use, said storage means including a plurality of delay lines into one end of which said words may be put in seriatim and out of the other end of which said words will emerge, said lines being of different lengths to store correspondingly different numbers of words, a greater magnitude detection circuit connected to each permutational pair of said delay lines to determine the relative values of the usage numbers of words simultaneously emerging from said pairs of delay lines, a blank detection circuit connected to each said delay line, an electronic network for selectively routing words emerging from said delay lines back into the same or other delay lines, a transfer selection matrix jointly controlled by said greater magnitude detection circuits and said blank detection circuits for operating said electronic network, and means for operating said greater magnitude detection circuits and said blank detection circuits prior to the emergence of said words from said delay lines and for operating said electronic network simultaneously with the emergence of said words.

7. In an information handling system, means for storing information in the form of words each consisting of a plurality of bits moving through storage in seriatim and each having as a forepart thereof a representation, expressed by said bits, of an identification or usage number constituting a key to the intended order in which said words will be demanded for use, said storage means including a plurality of delay lines into one end of which said words may be put in seriatim and out of the other end of which said words will emerge, said lines being of different lengths to store correspondingly different numbers of words, a greater magnitude detection circuit connected to each permutational pair of said delay lines to determine the relative values of the usage numbers of words simultaneously emerging from said lines of said pairs, a blank detection circuit connected to each said delay line, a demand line for reading into said system the usage number of a word demanded for use, a read out comparison circuit for each said delay line having one input connected to its said associated delay line and another input connected to said demand line for detecting identity between an emerging word in one of said delay lines and the said demanded word, an electronic network for selectively interconnecting said delay line inputs, said delay line outputs, demanded word outputs and a new word into storage input, a transfer selection matrix under the joint control of said greater magnitude detection circuits, said blank detection circuits and said read out comparison circuits for operating said electronic network, and means for operating said electronic network simultaneously with the emergence of said words from said storage lines.

8. In an information handling system, means for storing information in the form of words each consisting of a plurality of bits moving through storage in seriatim and each having as a forepart thereof a representation, expressed by said bits of an identification or usage number constituting a key to the intended order in which said words will be demanded for use, said storage means including a plurality of delay lines into one end of which said words may be put in seriatim and out of the other end of which said words will emerge, said lines being of different lengths to store correspondingly different numbers of words, a tap from each said line equal in operating length to the length of said usage numbers, means connected to said taps for determining the relative values of the usage numbers of words simultaneously emerging from said storage lines, and means controlled thereby for selectively routing said emerging words to the same or other delay lines.

9. In an information handling system, means for storing information in the form of words each consisting of a plurality of bits moving through storage in seriatim and each having as a forepart thereof a representation, expressed by said bits, of an identification or usage number constituting a key to the intended order in which said words will be demanded for use, said storage means including a plurality of delay lines into one end of which said words may be put in seriatim and out of the other end of which said words will emerge, said lines being of different lengths to store correspondingly different numbers of words, each said line consisting of two parts, a first part being of a length to store all of said words excepting only the usage number of a single word and a second part being equivalent to a length to store only a usage number, a tap taken from each said line at the junction of said first and said second part, means connected to said taps for determining the relative values of the usage numbers of words simultaneously emerging from said lines and means controlled thereby for selectively routing said emerging words to the same or other delay lines.

10. In an information handling system, means for storing information in the form of words each consisting of a plurality of bits moving through storage in seriatim and each having as a forepart thereof a representation, expressed by said bits, of an identification or usage number constituting a key to the intended order in which said words will be demanded for use, said storage means including a plurality of delay lines into one end of which said words may be put in seriatim and out of the other end of which said words will emerge, said lines being of different lengths to store correspondingly different numbers of words, each line consisting of two parts, a first part being of a length to store all of said words excepting only the usage number of a single word and a second part being equivalent to a length to store only a usage number, said first part being constructed and arranged to transmit signals from one end to the other thereof at a rate of a given unit of length per given unit of time and said second part being in the form of a cascade of electronic time delay units, a tap taken from each said line at the junction of said first and said second part, means connected to said taps for determining the relative values of the usage numbers of words simultaneously emerging from said lines and means controlled thereby for selectively routing said emerging words to the same or other delay lines.

11. In an information handling system, means for storing information in the form of words each consisting of a plurality of bits moving through storage in seriatim and each having as a forepart thereof a representation, expressed by said bits, of an identification or usage number constituting a key to the intended order in which said words will be demanded for use, said storage means including a plurality of delay lines into end of which said words may be put in seriatim and out of the other end of which said words will emerge, said lines being of different lengths to store correspondingly different numbers of words, each line consisting of two parts, a first part being an acoustic delay of a length to store all of said words excepting only the usage number of a single word and a second part being an electronic circuit delay equivalent to a length to store only a usage number, the rate of signal spacing being determined by said electronic circuit delay means and independent of the rate of signal propagation through said acoustic delay, a tap taken from each said line at the junction of said first and said second parts thereof, means connected to said taps for determining the relative values of the usage numbers of words simultaneously emerging from said lines and means controlled thereby for selectively routing said emerging words to the same or other delay lines.

12. Means for sorting items of information consisting of a plurality of unequal length transmission delay lines each having an input and an output and each being constructed and arranged to hold a cardinal number of items of information, an output channel for transmitting said items of information from said sorting means, an input channel for transmitting items of information into said sorting means and switching means for variously interconnecting said inputs and outputs whereby said sorting means may be constantly filled with items of information constantly in transit through said delay lines, means for scanning information prior to its issuance from said outputs and means responsive thereto for changing the pattern of operation of said switching means.

13. In an information handling system, means for storing information in the form of words each consisting of a plurality of bits moving through storage in seriatim and each having as a forepart thereof, a representation, expressed by said bits, of an identification or usage number constituting a key to the intended order in which said words will be demanded for use, said storage means including a plurality of delay lines into one end of which said words may be put in seriatim and out of the other end of which said words will emerge, said lines being of different lengths to store correspondingly different numbers of words, a tap from each said line equal in operating length to the length of said usage numbers, means connected to said taps for determining the relative values of the usage numbers of words simultaneously emerging from said storage lines, said last means each consisting of a greater magnitude detection circuit comprising an input wire A, and input wire B, and an output wire to indicate that $A>B$, a first latch responsive to a bit transmitted over wire A prior to the transmission of a bit over wire B, a second latch responsive to a bit transmitted over wire B, means controlled by said second latch for thereafter rendering said first latch unresponsive to any bit transmitted over wire A, means connected to said wire A for preventing the transmission of a bit from said wire B to said second latch and like means connected to said wire B for preventing the transmission of a bit from said wire B to said first latch, said two last means constituting means responsive to the concurrent transmission of a bit over both wires A and B to prevent the operation of either of said latches and a third output latch responsive to said first latch for enabling said $A>B$ output wire, and means controlled thereby for selectively routing said emerging words to the same or other delay lines.

References Cited in the file of this patent

UNITED STATES PATENTS

| | | |
|---|---|---|
| 2,600,372 | Leclerc | Nov. 24, 1953 |
| 2,674,733 | Robbins | Apr. 6, 1954 |
| 2,679,638 | Bensky | May 25, 1954 |
| 2,700,755 | Burkhart | Jan. 25, 1955 |
| 2,735,082 | Goldberg et al. | Feb. 14, 1956 |
| 2,760,087 | Felker | Aug. 21, 1956 |
| 2,799,845 | Dietrich | July 16, 1957 |
| 2,811,707 | Henning et al. | Oct. 29, 1957 |
| 2,821,696 | Shiowitz et al. | Jan. 28, 1958 |
| 2,837,732 | Nelson | June 3, 1958 |
| 2,885,659 | Spielberg | May 5, 1959 |
| 2,901,732 | Canning | Aug. 25, 1959 |
| 2,907,003 | Hobbs | Sept. 29, 1959 |

OTHER REFERENCES

N.B.S. Report 1519 "Analysis of the Application of Large-Scale Digital Computers to a Sorting Process," March 1952.

UNITED STATES PATENT OFFICE

CERTIFICATE OF CORRECTION

Patent No. 2,994,065 July 25, 1961

Llewelyn H. Thomas et al.

It is hereby certified that error appears in the above numbered patent requiring correction and that the said Letters Patent should read as corrected below.

Column 13, Table 3, column 1, line 15 thereof, for "B>A" read -- B>C --; column 15, line 41, strike out "of", first occurrence; column 22, line 7, after "circuits" insert a period; column 23, line 19, for "order" read -- other --; line 72, for "sore" read -- store --.

Signed and sealed this 6th day of February 1962.

(SEAL)
Attest:

ERNEST W. SWIDER
Attesting Officer

DAVID L. LADD
Commissioner of Patents